United States Patent
Gorsica et al.

(10) Patent No.: US 11,206,506 B2
(45) Date of Patent: Dec. 21, 2021

(54) DELIVERING INFORMATION TO USERS IN PROXIMITY TO A COMMUNICATION DEVICE

(71) Applicant: MOTOROLA MOBILITY LLC, Chicago, IL (US)

(72) Inventors: John J. Gorsica, Round Lake, IL (US); Rachid Alameh, Crystal Lake, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/712,467

(22) Filed: Dec. 12, 2019

(65) Prior Publication Data

US 2021/0185477 A1 Jun. 17, 2021

(51) Int. Cl.
| | |
|---|---|
| H04W 24/00 | (2009.01) |
| H04W 4/02 | (2018.01) |
| H04L 12/58 | (2006.01) |
| H04L 29/08 | (2006.01) |
| H04W 4/12 | (2009.01) |
| H04M 1/7243 | (2021.01) |

(52) U.S. Cl.
CPC ............ *H04W 4/023* (2013.01); *H04L 51/20* (2013.01); *H04L 67/24* (2013.01); *H04M 1/7243* (2021.01); *H04W 4/12* (2013.01)

(58) Field of Classification Search
USPC .......... 455/417, 456.1–457, 466, 412.1–413
See application file for complete search history.

(56) References Cited

U.S. PATENT DOCUMENTS

| | | | |
|---|---|---|---|
| 7,689,452 B2 | 3/2010 | Lam et al. | |
| 8,107,957 B1 | 1/2012 | O'Neil et al. | |
| 2002/0002635 A1 | 1/2002 | Astala et al. | |
| 2006/0020904 A1 | 1/2006 | Aaltonen et al. | |
| 2006/0165030 A1* | 7/2006 | Fox ........................ | H04W 4/16 370/328 |
| 2008/0095071 A1 | 4/2008 | Lu et al. | |
| 2008/0205608 A1 | 8/2008 | Tai et al. | |
| 2008/0242270 A1 | 10/2008 | Marui et al. | |
| 2009/0098859 A1* | 4/2009 | Kamdar ................ | H04L 51/14 455/412.1 |
| 2011/0173574 A1 | 7/2011 | Clavin et al. | |
| 2012/0066223 A1 | 3/2012 | Schentrup et al. | |
| 2013/0316687 A1 | 11/2013 | Subbaramoo et al. | |
| 2014/0115490 A1 | 4/2014 | Yamasani et al. | |
| 2014/0143393 A1 | 5/2014 | Perea et al. | |
| 2014/0222931 A1 | 8/2014 | Hemar et al. | |
| 2014/0372179 A1 | 12/2014 | Ju et al. | |

(Continued)

*Primary Examiner* — Suhail Khan
(74) *Attorney, Agent, or Firm* — Isidore PLLC

(57) ABSTRACT

A method, a computing system, and a computer program product for delivering a message to a user via at least one communication device. The method includes receiving, via a processor of a computing system, a message for a user. User presence data is received from several communication devices associated with the user, the communication devices including a first communication device and at least one second communication device. The received user presence data is stored for each communication devices to a database of the computing system. The method further includes identifying, based on the user presence data, a recipient communication device from among the communication devices to deliver the message to the user.

16 Claims, 15 Drawing Sheets

(56) References Cited

U.S. PATENT DOCUMENTS

| | | |
|---|---|---|
| 2016/0266648 A1 | 9/2016 | Shingu et al. |
| 2016/0360031 A1 | 12/2016 | Rauenbuehler et al. |
| 2017/0187868 A1 | 6/2017 | Katai et al. |
| 2017/0244659 A1* | 8/2017 | Muthukrishnan ....... H04L 51/14 |
| 2017/0353549 A1 | 12/2017 | Passeri et al. |
| 2018/0063295 A1* | 3/2018 | Belikovetsky ...... H04L 12/1845 |
| 2018/0352530 A1 | 12/2018 | Singh et al. |
| 2020/0012996 A1 | 1/2020 | Sugiyama et al. |
| 2020/0077361 A1* | 3/2020 | Huang ................ H04L 65/1063 |

* cited by examiner

DELIVERING INFORMATION TO USERS IN PROXIMITY TO A COMMUNICATION DEVICE

BACKGROUND

1. Technical Field

The present disclosure generally relates to communication devices and in particular to proximity-based delivery of information to active and non-active users of a communication device

2. Description of the Related Art

Mobile communication devices, such as cell phones, are widely used for voice communication and data transmission. Users of these devices typically have several other user devices that are utilized by or associated with that user. For example, the user may have a wearable device, an in-office, in-vehicle, or in-home smart device, equipped with a virtual assistant, etc. Mobile communication devices communicate with other network systems such as cellular base stations and computer communication network systems Frequently, communication systems need to deliver various types of information, such as e-mail, text messages and videos, to an individual. Unfortunately, the individual may not always be near their mobile communication device or another communication device that they use in order to timely receive the information.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
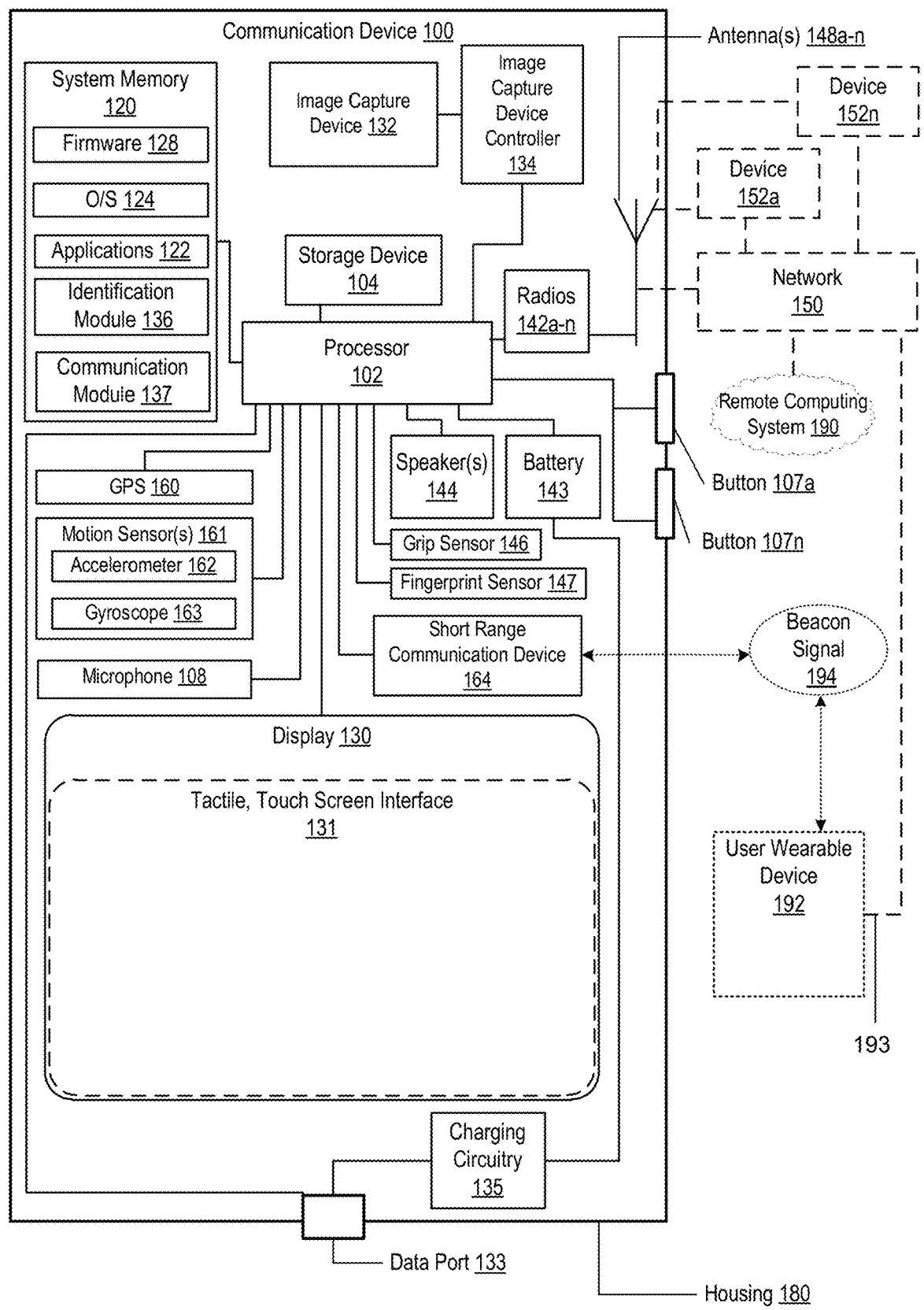
FIG. 1A depicts an example communication device configured as a mobile device within which various aspects of the disclosure can be implemented, according to one or more embodiments.

According to a first aspect of the disclosure, the illustrative embodiments provide a method, a computing system, a computer program product, and a communication device for delivering a message to a user via at least one communication device. According to a first embodiment, the method includes receiving, via a processor of a computing system, a message for a user. The computing system includes a messaging system. The method includes receiving user presence data from several communication devices associated with the user, the communication devices including a first communication device and at least one second communication device. The received user presence data is stored, for each communication device, to a database of the computing system. The method further includes identifying, based on the user presence data, a recipient communication device from among the communication devices to deliver the message to the user.

According to another embodiment, a computing system comprises a memory having stored thereon a messaging module for delivering a message to a user via at least one communication device from among several communication devices associated with the user. One or more processors are communicatively coupled to the memory. The one or more processors execute program code of the messaging module to provide a messaging system, which enables the computing system to receive a message for the user and to receive user presence data from the communication devices associated with the user. The communication devices associated with the user includes a first communication device and at least one second communication device. The program code further enables the computing system to store the received user presence data for each of the communication devices to a database of the computing system and to identify, based on the user presence data, a recipient communication device from among the communication devices to deliver the message to the user.

According to an additional embodiment, a computer program product includes a computer readable storage device with program code stored thereon which, when executed by one or more processors of a computing system, enables the computing system to implement a messaging system that enables the computing system to complete the functionality of receiving a message for a user and receiving user presence data from several communication devices associated with the user. The computer program product further enables the computing system to store the received user presence data for each of the communication devices to a database of the computing system and to identify, based on the user presence data, a recipient communication device from among the communication devices to deliver the message to the user.

According to a further embodiment, a method is provided for delivering a message to a user via at least one communication device. The method includes collecting, via at least one component of a first communication device, biometric data associated with at least one active or non-active user of the first communication device and receiving, by a processor of the first communication device, the biometric data from the at least one component. The method further includes determining, via the processor, if the biometric data matches reference biometric data associated with the at least one user and, in response to determining that the biometric data matches the reference biometric data associated with the at least one user, generating user presence data. The user presence data indicates that the at least one user is within a vicinity of the first communication device. The method includes transmitting the user presence data to a computing system that includes a messaging system for routing received messages to selected user devices based on received user presence and proximity data.

According to a second aspect of the disclosure, the illustrative embodiments further provide a method, a computing system, a computer program product, and a communication device for sending a message to active and/or non-active users of a first communication device. The method includes receiving, via a processor of a computing system, a message for a non-active user of a first communication device. The first communication device is associated with an active user and the non-active user. The method further includes receiving, from the first communication device, user presence data for the non-active user and for the active user and determining, based on the user presence data, if the non-active user is in proximity to the first communication device. In response to determining that the non-active user is in proximity to the first communication device, the method includes designating the first communication device as a recipient communication device to deliver the message to the non-active user and forwarding the message to the first communication device for delivery, via the first communication device, to the non-active user.

According to another embodiment, a computing system comprises a memory having stored thereon a messaging module for sending a message to active and non-active users of a first communication device. One or more processors are communicatively coupled to the memory. The one or more processors execute program code of the messaging module, which enables the computing system to receive a message for a non-active user of a first communication device. The first communication device is associated with the active user and the non-active user. The program code further enables the computing system to receive, from the first communication device, user presence data for the non-active user and for the active user and to determine, based on the user presence data, if the non-active user is in proximity to the first communication device. In response to determining that the non-active user is in proximity to the first communication device, the first communication device is designated as a recipient communication device to deliver the message to the non-active user. The program code further enables the computing system to forward the message for delivery, via the first communication device, to the non-active user.

According to an additional embodiment, a computer program product includes a computer readable storage device with program code stored thereon which, when executed by one or more processors of a computing system, enables the computing system to complete the functionality of receiving a message for a non-active user of a first communication device. The first communication device is associated with an active user and the non-active user. The computer program product further enables the computing system to receive, from the first communication device, user presence data for the non-active user and for the active user and to determine, based on the user presence data, if the non-active user is in proximity to the first communication device. In response to determining that the non-active user is in proximity to the first communication device, the first communication device is designated as a recipient communication device to deliver the message to the non-active user. The computer program product further enables the computing system to forward the message for delivery, via the first communication device, to the non-active user.

According to another embodiment, a method for sending a message to a non-active user of a first communication device is provided. The method includes collecting, via at least one component of a first communication device, biometric data associated with active and non-active user of the first communication device. The non-active user is a user registered with the first communication device. The first communication device is associated with several registered users including the non-active user and an active user. The method further includes receiving, by a processor of the first communication device, the biometric data from the at least one component and determining, via the processor, if the biometric data matches reference biometric data associated with the non-active user. In response to determining that the biometric data matches the reference biometric data associated with the non-active user, the method includes generating user presence data, which indicates that the non-active user is within a vicinity of the first communication device. The method further includes transmitting the user presence data to a computing system that provides a messaging system.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example communication device 100 configured as a mobile device within which various aspects of the disclosure can be implemented, according to one or more embodiments. Examples of such communication devices include, but are not limited to, a notebook computer, a mobile phone, a digital camera, and a tablet computer, etc. Communication device 100 includes processor 102, which is communicatively coupled to storage device 104, system memory 120, display 130, and image capture device controller 134.

System memory 120 may be a combination of volatile and non-volatile memory, such as random access memory (RAM) and read-only memory (ROM). System memory 120 can store program code or similar data associated with firmware 128, an operating system 124, applications 122, identification module 136 and communication module 137. Identification module 136 includes program code that is executed by processor 102 to enable identifying active and non-active users in proximity to communication device 100. Communication module 137 includes program code that is executed by processor 102 to enable communication device 100 to communicate with other devices and system. Although depicted as being separate from applications 122, identification module 136 and communication module 137 may also be each implemented as an application. Processor 102 loads and executes program code stored in system memory 120. Examples of program code that may be loaded and executed by processor 102 include program code associated with applications 122 and program code associated with identification module 136 and communication module 137.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or control communication device 100 by touching features presented within/below the display screen.

In one embodiment, image capture device 132 is communicatively coupled to image capture device controller 134, which is communicatively coupled to processor 102. Image capture device 132 can capture images that are within the field of view of image capture device 132. In an embodiment, image capture device 132 can capture biometric data in facial images of users and non-users in proximity to communication device 100.

Communication device 100 can further include data port 133, charging circuitry 135, and battery 143. Communication device 100 further includes a microphone 108, one or more speakers 144 and one or more input buttons 107a-n. Input buttons 107a-n may provide controls for volume, power, and image capture device 132.

Communication device 100 further includes radios 142a-n, which are coupled to antennas 148a-n. In this implementation, radios 142a-n and antennas 148a-n allow communication device 100 to communicate wirelessly with other devices 152a-n via wireless network 150. In one embodiment, a remote computing system 190 can communicate with communication device 100 via wireless network 150. According to one embodiment, various software modules can be stored within and be executed by remote computing system 190 to enable or support various functions of communication device 100. In one embodiment, remote computing system 190 can be a cloud based computing system or environment.

Communication device 100 further includes grip sensor 146, fingerprint sensor 147, global positioning system (GPS) device 160 and motion sensor 161. Grip sensor 146 is a pressure or tactile sensor arranged on the peripheral edge of the housing of communication device 100. Grip sensors 146 measure the force applied by a user's hand and can provide biometric data to identity a user of communication device 100. Fingerprint sensor 147 can scan the finger of a user and generate biometric data or fingerprint data corresponding to the user's fingerprint. A user places his/her finger over the fingerprint sensor in order to initiate scanning of the fingerprint. Fingerprint sensor 147 can be used to provide biometric data to identify a user. GPS device 160 can provide time data and location data about the physical location of communication device 100 using geospatial input received from GPS satellites.

Motion sensor(s) 161 can include one or more accelerometers 162 and gyroscope 163. Motion sensor(s) 161 can detect movement of communication device 100 and provide motion data to processor 102 indicating the spatial orientation and movement of communication device 100. Accelerometers 162 measure linear acceleration of movement of communication device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of communication device 100. Communication device 100 further includes a housing 180 that contains the components of the communication device.

Communication device 100 further includes short range communication device 164. Short range communication device 164 is a low powered transceiver that wirelessly communicates with other devices such as user wearable device 192. Short range communication device 164 can include one or more of a variety of devices, such as a near field communication (NFC) device, a Bluetooth device, and/or a wireless fidelity (Wi-Fi) device. User wearable device 192 can include one or more of a variety of devices such as a smart-watch, key-fob, fitness tracker or smart-glasses.

In one embodiment, user wearable device 192 can transmit a beacon signal 194 to short range communication device 164. Communication device 100 can use beacon signal 194 to calculate the proximity or distance between a person wearing user wearable device 192 and communication device 100 using various techniques. In one embodiment, communication device 100 can use time of flight (TOF) to calculate the distance between user wearable device 192 and communication device 100. TOF is the amount of time a signal takes to propagate from a transmitter to a receiver. Because the signal propagation rate is constant, the travel time of a signal can be used to directly calculate distance. In another embodiment, communication device 100 can use received signal strength indication (RSSI) to calculate the distance. RSSI is a measurement of the power level received by a receiver. The distance between user wearable device 192 and communication device 100 can be calculated based on the relationship between the transmitted and received signal strength and the amount of time the signal takes to propagate from a transmitter to a receiver.

In one embodiment, beacon signal 194 is used to determine or measure the distance between the user (wearing user wearable device 192) and communication device 100, thus providing a measure of presence between communication device 100, user wearable device 192, and the user. In another embodiment, user wearable device 192 can authenticate the user, via use of a passcode, personal identification number or biometrically via use of facial recognition. When shared with communication device 100, this authentication information can help to authenticate or identify users.

Figure 1B:
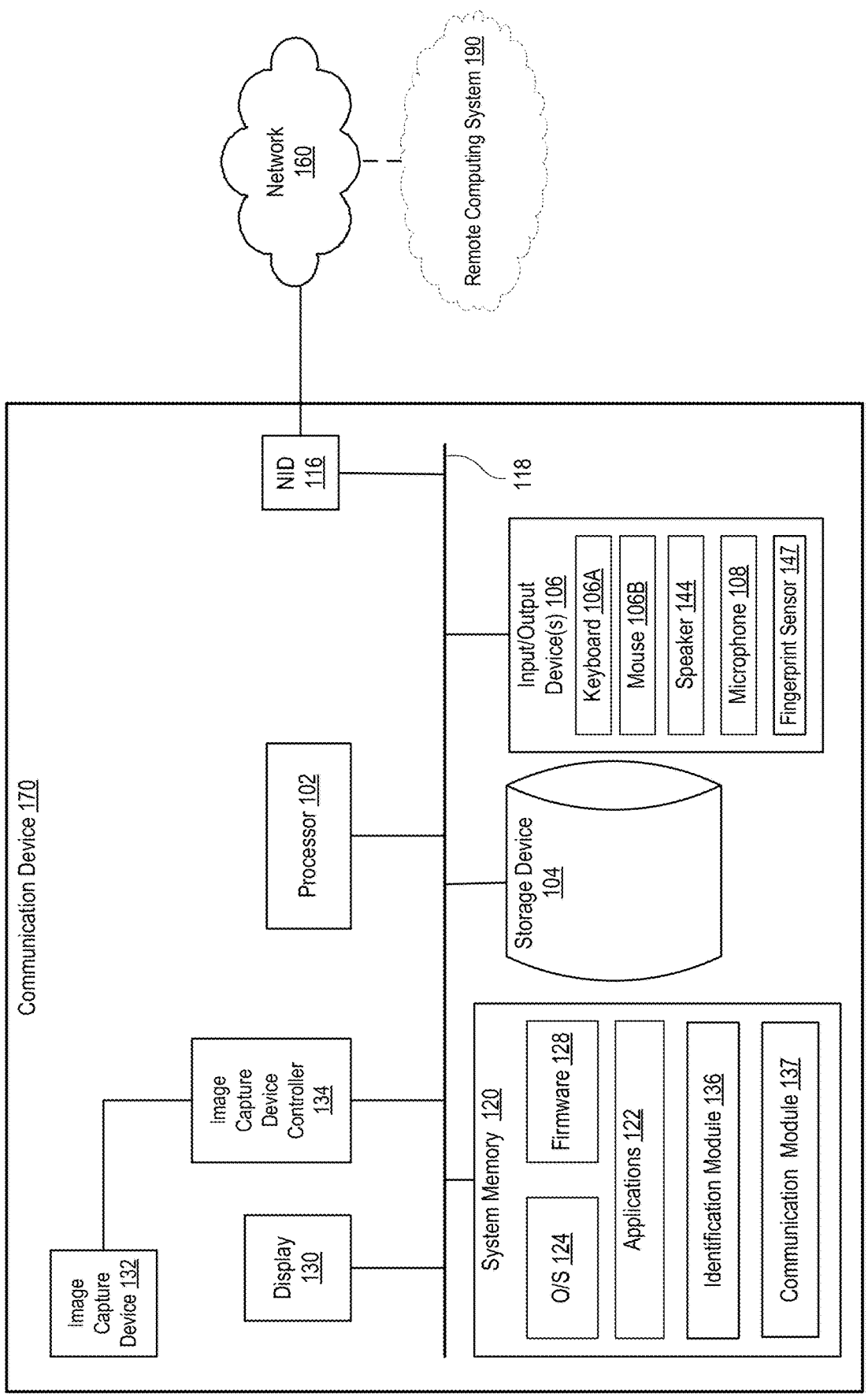
FIG. 1B depicts an example communication device configured as a computing device within which various aspects of the disclosure can be implemented, according to one or more embodiments.

FIG. 1B depicts an example communication device configured to be a computing device, according to one or more embodiments. Communication device 170 can be any computing device that is configured to and which supports communication with remote computing system 190. Examples of such communication devices include, but are not limited to, a desktop computer, a television, a monitor, a smart-speaker, a notebook computer, etc. Communication device 170 includes a processor 102, storage device 104, system memory 120 and display 130. System bus 118 communicatively couples one or more of the processor 102, storage device 104, system memory 120 and display 130 with each other. Additionally, communication device 170 includes one or more input/output devices 106, network interface device (NID) 116, image capture device 132, and image capture device controller 134. System bus 118 communicatively couples one or more of the input/output device 106, NID 116, image capture device 132, and image capture device controller 134 to one or more components, such as processor 102 and system memory 120. Input/output devices 106 can be various devices such as a keyboard 106A, a mouse 106B, a speaker 144, a microphone 108, fingerprint sensor 147, etc.

System memory 120 may be a combination of volatile and non-volatile memory, such as random access memory (RAM) and read-only memory (ROM). System memory 120 can store program code or similar data associated with firmware 128, an operating system 124, applications 122, identification module 136, and communication module 137. Identification module 136 includes program code that is executed by processor 102 to enable the identification of active and non-active users in proximity to communication device 170. Communication module 137 includes program code that is executed by processor 102 to enable communication device 170 to communicate with other devices and systems. Although depicted as being separate from applications 122, identification module 136 and communication module 137 may also be each implemented as one or more applications. Processor 102 loads and executes program code stored in system memory 120. Examples of program code that may be loaded and executed by processor 102 include program code associated with applications 122 and program code associated with identification module 136 and communication module 137.

Communication device 170 can be in communication, via NID 116, with one or more networks, generally represented as network 160. Network 160 can be a variety of networks such as a local area network, a wide area network, a wireless network or the internet. Communication device 170 can be in communication with remote computing system 190 via network 160.

Figure 2:
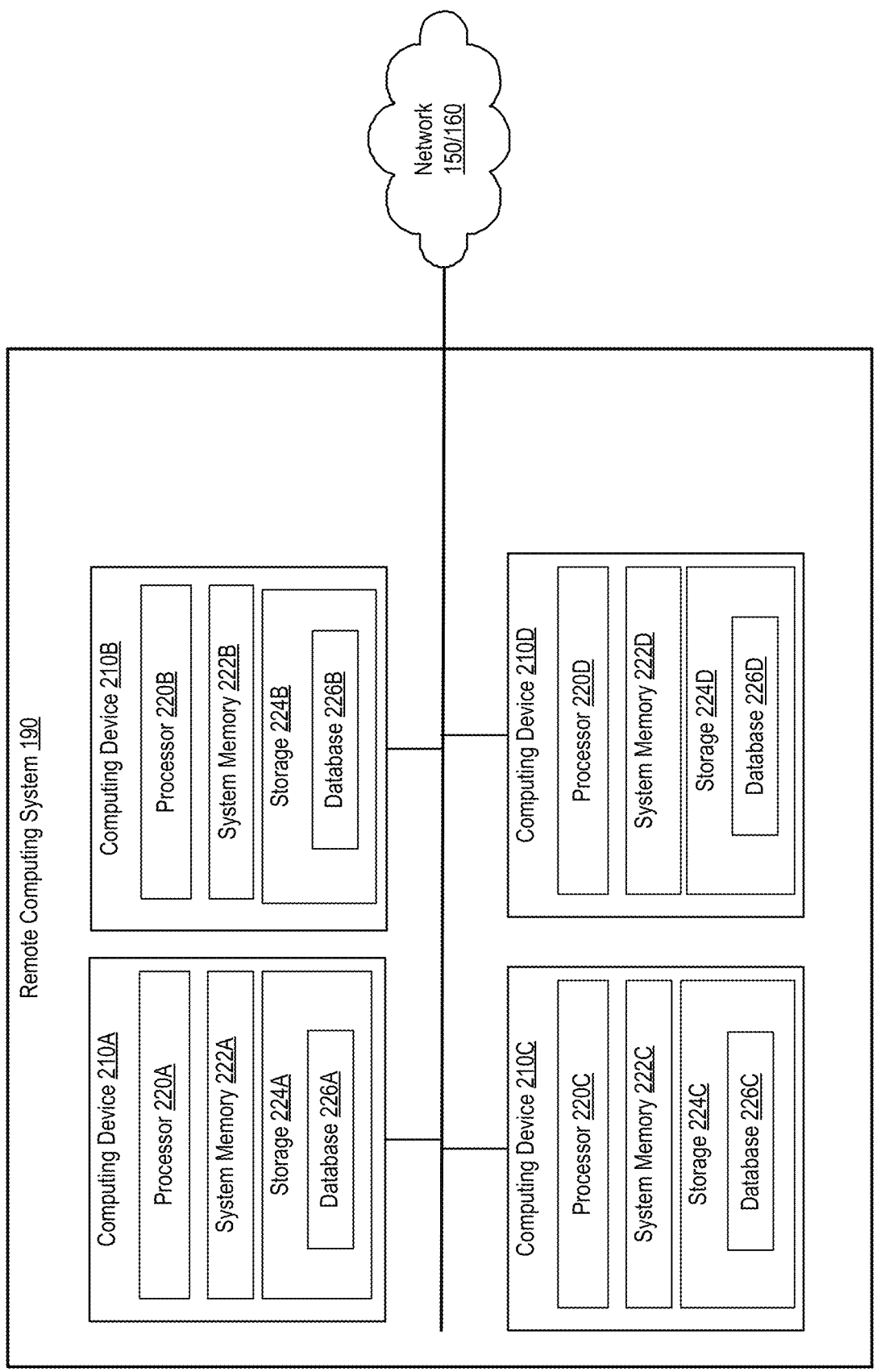
FIG. 2 depicts an example remote computing system within which various aspects of the disclosure can be implemented, according to one or more embodiments.

In the description of each of the following figures, reference is also made to specific components illustrated within the preceding figure(s). With reference now to FIG. 2, details of a data processing system (DPS) or remote computing system 190 are shown. In one embodiment, remote computing system 190 can be a cloud based computing system or environment. Remote computing system 190 includes several computing devices 210A, 210B, 210C and 210D (collectively 210A-D). Computing devices 210A-D can include various computing devices such as computers, servers, nodes and blades.

Computing devices 210A-D include respective processors 220A-D, respective system memory 222A-D and respective storage devices 224A-D. A system bus (not shown) communicatively couples one or more of the processor, system memory and storage device with each other within respective computing devices 210A-D. System memory 222A-D may be a combination of volatile and non-volatile memory, such as random access memory (RAM) and read-only memory (ROM). System memory 222A-D can store program code or similar data associated with an operating system, applications and software modules. Processors 220A-D load and execute program code stored in system memory 222A-D. Storage devices 224A-D includes respective databases 226A-D. In one embodiment, databases 226A-D can be located on other networked databases that are remote from computing devices 210A-D. Databases 226A-D can store various information and data, such as data received from one or more communication devices 100 and/or 170.

One or more networks, generally represented as networks 150/160, can be in communication with remote computing system 190. Network 150/160 can be a variety of networks such as a local area network, a wide area network, a wireless network, or the Internet. Communication devices 100 and/or 170 can be in communication with remote computing system 190 via networks 150 and/or 160.

Figure 3A:
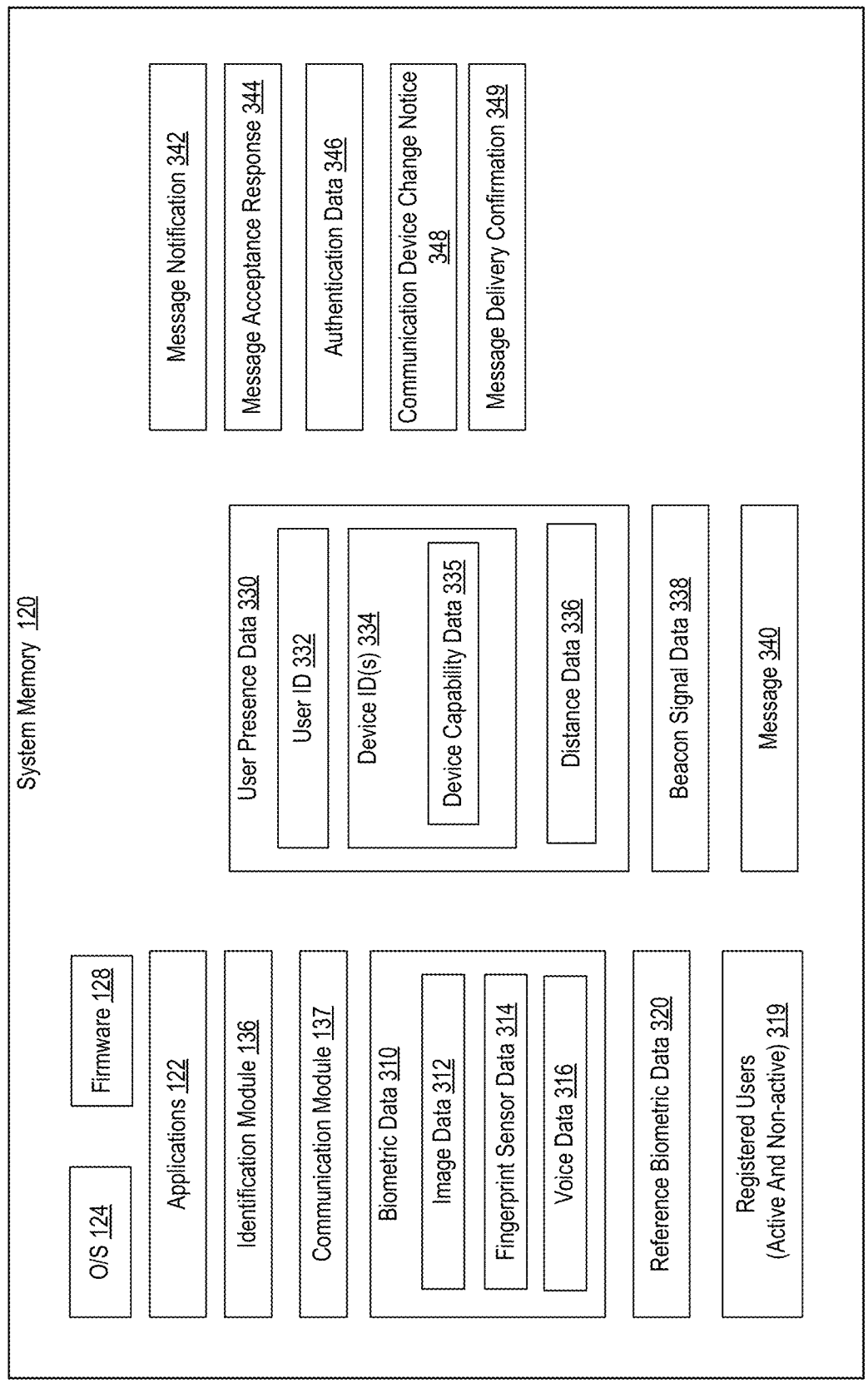
FIG. 3A is a block diagram of example contents of the system memory of a communication device, according to one or more embodiments.

Referring to FIG. 3A, one embodiment of example contents of system memory 120 of communication device 100/170 is shown. System memory 120 includes data, software, and/or firmware modules, including firmware 128, operating system 124, applications 122, identification module 136, and communication module 137. In one embodiment, identification module 136 enables the identification of a user in proximity to communication device 100 or 170. In one embodiment, execution of identification module 136 by processor 102 enables/configures communication device 100 or 170 to perform the processes presented in the flowcharts of FIGS. 5A-B and 6 as will be described below. In another embodiment, identification module 136 enables the delivery of a message to a non-active user of communication device 100 or 170. In another embodiment, execution of identification module 136 by processor 102 enables/configures communication device 100 or 170 to perform the processes presented in the flowchart of FIG. 9, as will be described below. Communication module 137 enables communication device 100 or 170 to communicate with network 150 or 160 and remote computing system 190.

System memory 120 further includes biometric data 310, registered users 319, and reference biometric data 320. Biometric data 310 are distinctive measurable values, characteristics and biomarkers used to describe, identify and authenticate individuals. Biometric data 310 includes image data 312, fingerprint sensor data 314 and voice data 316. Image data 312 includes facial images captured by image capture device 132 (FIG. 1). Fingerprint sensor data 314 includes fingerprint images captured by fingerprint sensor 147 (FIG. 1). Voice data 316 includes speech of individuals captured by microphone 108 (FIG. 1).

Registered users 319 are individuals associated with the communication device that have previously registered or enrolled with the communication device. Registered users 319 include information regarding active users and non-active users. The active user of communication device 100 or 170 is the current validated user of the communication device. The active user of communication device 100 or 170 would have logged-in, claimed or otherwise be currently authenticated to the communication device. A non-active user of communication device 100 or 170 is one who is registered as being associated with the communication device, but is not the current active user of the communication device.

Reference biometric data 320 are stored authenticated biomarkers of registered users associated with communication device 100 or 170. Reference biometric data 320 includes stored authenticated facial images of the face of registered users associated with communication devices 100 or 170, stored authenticated fingerprints of the fingers of registered users associated with communication devices 100 or 170, and stored authenticated voices of registered users associated with communication device 100 or 170.

System memory 120 further includes user presence data 330 and beacon signal data 338. User presence data 330 includes user identifiers 332, device identifiers 334, and distance data 336. User identifiers 332 are the identity of authenticated active and non-active registered users of communication devices 100 or 170. Device identifiers 334 are the identity of communication devices 100 or 170. Device identifiers 334 are associated with or include device capability data 335, which is information about the type of communication device and capabilities associated with respective device identifiers 334. For example, if the communication device is a mobile phone, the device capabilities can include a display, speaker and an image capture device. Distance data 336 is the calculated distance between communication devices 100 or 170 and a user of communication devices 100 or 170. Beacon signal data 338 is data received from user wearable device 192 and can include, time data, TOF data and RSSI data.

System memory 120 further includes message 340 and message notification 342. Message 340 is information that has been received from remote computing system 190 to present to a user. Message 340 can include a wide variety of information such as notifications from cloud computing services, e-mails, instant messages, social media updates, text messages, pictures, videos, and other data. Message 340 includes a user identifier to identify the user for whom the message is intended. Message notification 342 is a notification received from remote computing system 190 that a message for a non-active user is available.

System memory 120 further includes message acceptance response 344, authentication data 346, communication device change notice 348, and message delivery confirmation 349. Message acceptance response 344 is transmitted to remote computing system 190 in order to accept message 340 for a non-active user of the communication device. Message acceptance response 344 is transmitted in response to message notification 342. Authentication data 346 is validation information such as detected biometric data or a received passcode or password from a non-active user of the communication device. In one embodiment, authentication data 346 can be provided via I/O devices 106 or touch screen interface 131.

Communication device change notice 348 is a notice transmitted to remote computing system 190 after a non-active user has entered or designated a new recipient communication device to receive a message on. Communication device change notice 348 can include the device identity of the new recipient communication device. Message delivery confirmation 349 is transmitted to remote computing system 190 after message 340 has been received.

Figure 3B:
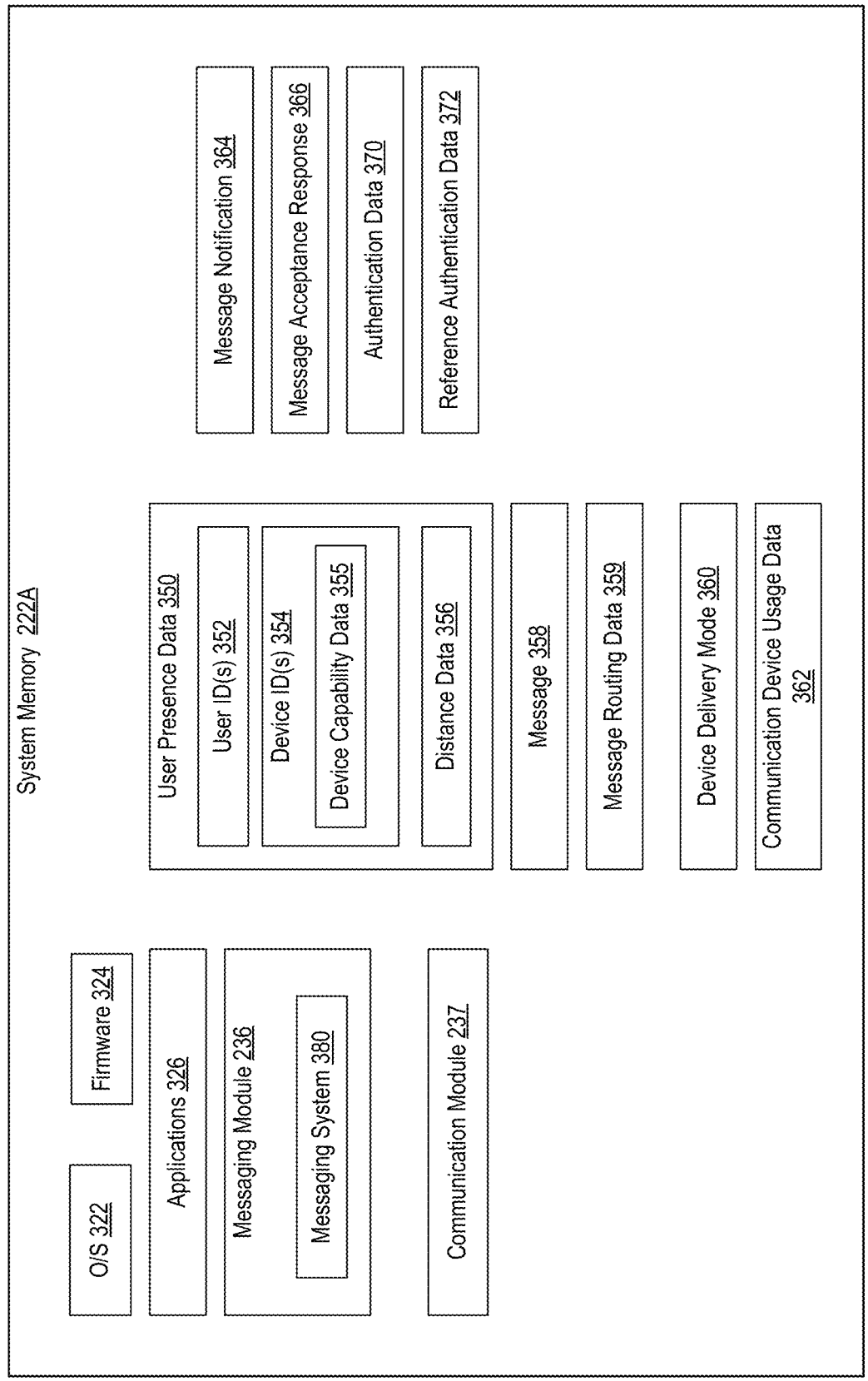
FIG. 3B is a block diagram of example contents of the system memory of a remote computing system, according to one or more embodiments.

Turning to FIG. 3B, one embodiment of example contents of system memory 222A of computing device 210A is shown. System memory 222A includes data, software, and/or firmware modules, including firmware 324, operating system (O/S) 322, applications 326, messaging module 236, and communication module 237. In one embodiment, messaging module 236 enables the delivery or presentation of a message by a communication device that is closest to a user to deliver a message. Messaging module 236 can implement a messaging system 380. In an embodiment, execution of messaging module 236 by processor 220A configures computing device 210A to provide messaging system 380 and to perform processes presented in the flowchart of FIG. 7, as will be described below. In another embodiment, messaging module 236 enables a communication device to deliver or present a message to a non-active user of a communication device. In an embodiment, execution of messaging module 236 by processor 220A enables/configures computing device 210A to perform the processes presented in the flowcharts of FIGS. 8A-B, as will be described below.

System memory 222A further includes user presence data 350. User presence data 350 is received from communication devices 100 and/or 170. User presence data 350 includes user identifiers 352, device identifiers 354, and distance data 356. User identifiers 352 are the identity of active and non-active users of communication devices 100 or 170. Device identifiers 354 are the identity of registered communication devices 100 or 170 that have been previously registered. Device identifiers 354 are associated with or include device capability data 355, which is information about the type of communication device and capabilities associated with respective device identifiers 354. Distance data 356 is the calculated distance between communication devices 100 or 170 and a user of communication devices 100 or 170.

System memory 222A further includes message 358, message routing data 359, device delivery mode 360, and communication device use data 362. Message 358 is information that has been received by remote computing system 190 to present to a user. Message 358 can include a wide variety of information such as notifications from cloud computing services, e-mails, instant messages, social media updates, text messages, pictures, videos and other data. Message 358 includes a user identifier to identify the user for whom the message is intended. Message routing data 359 incudes communication device and network information for routing message 358 to an intended recipient. Device delivery mode 360 is a pre-selected delivery mode to present messages 358 to a user. In one embodiment, for example, device delivery mode 360 can be selected to present messages on all communication devices that a user is currently in proximity of In another embodiment, device delivery mode 360 can be selected to present messages on the communication device that is most frequently used by a user. In an additional embodiment, device delivery mode 360 can be selected to present messages on the communication device that is closest to a user. Communication device usage data 362 contains the frequency of use of each communication device that each user receives messages on.

System memory 222A further includes message notification 364 and message acceptance response 366. Message notification 364 is a notification sent to communication device 100 or 170 that a message for a non-active user is available. Message acceptance response 366 is a response received from communication device 100 or 170 that instructs remote computing system 190 to send the message for the non-active user to communication device 100 or 170.

System memory 222A further includes authentication data 370 and reference authentication data 372. Authentication data 370 is authentication or validation data received from a non-active user to establish a session with remote computing device 190. For example, authentication data 370 can be a passcode or password. Reference authentication data 372 includes previously stored valid passcodes and passwords associated with the non-active user.

Figure 4A:
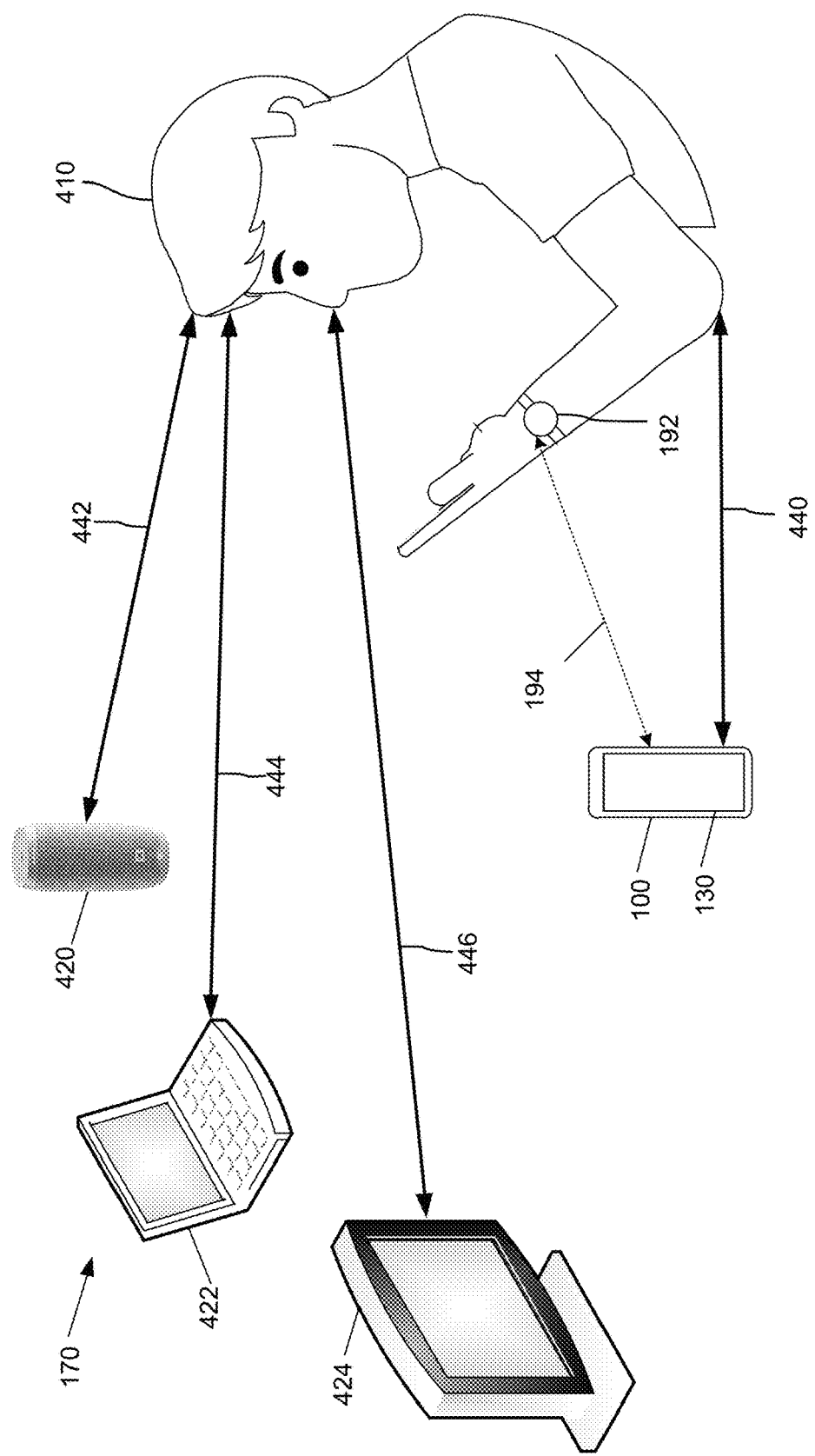
FIG. 4A is an example illustration of a user in proximity to one or more communication devices, according to one or more embodiments.

FIG. 4A illustrates an example of user 410 in proximity to communication devices 100 and 170. Communication devices 100 can include mobile phones and other portable devices. Communication devices 170 can include smart-speaker 420, portable computer 422, television or monitor 424 and user wearable device 192. In one embodiment, communication devices 100 and/or 170 are enabled to identify or authenticate user 410 and forward the identity of the user to remote computing system 190 (FIGS. 1A, 1B and 2).

User 410 is shown wearing user wearable device 192. User wearable device 192 can be one of a variety of devices, such as a smart-watch, key-fob, fitness tracker, or smart-glasses. In one embodiment, user wearable device 192 can transmit a beacon signal 194 to communication device 100. Communication device 100 can use beacon signal 194 to calculate the distance 440 between user 410 and communication device 100 using various techniques such as TOF and RSSI. Similarly, communication devices 170 can estimate the distance between user 410 and communication devices 170 using various techniques. For example, if an image capture device 132 (FIGS. 1A, 1B) captures the facial image corresponding to user 410, then it is known that the user 410 is within (less than) a focal distance of image capture device 132.

Communication device 100 is a distance 440 from user 410. Smart-speaker 420 is a distance 442 from user 410. Portable computer 422 is a distance 444 from user 410. Television or monitor 424 is a distance 446 from user 410. In one embodiment, one or more of communication devices 100 and 170 can identify a user and transmit distance data 336 (FIG. 3A) to remote computing system 190. Remote computing system 190 can use distance data 336 to determine a communication device that is in proximity to or closest to user 410. In FIG. 4A, communication device 100 is closest to user 410.

Figure 4B:
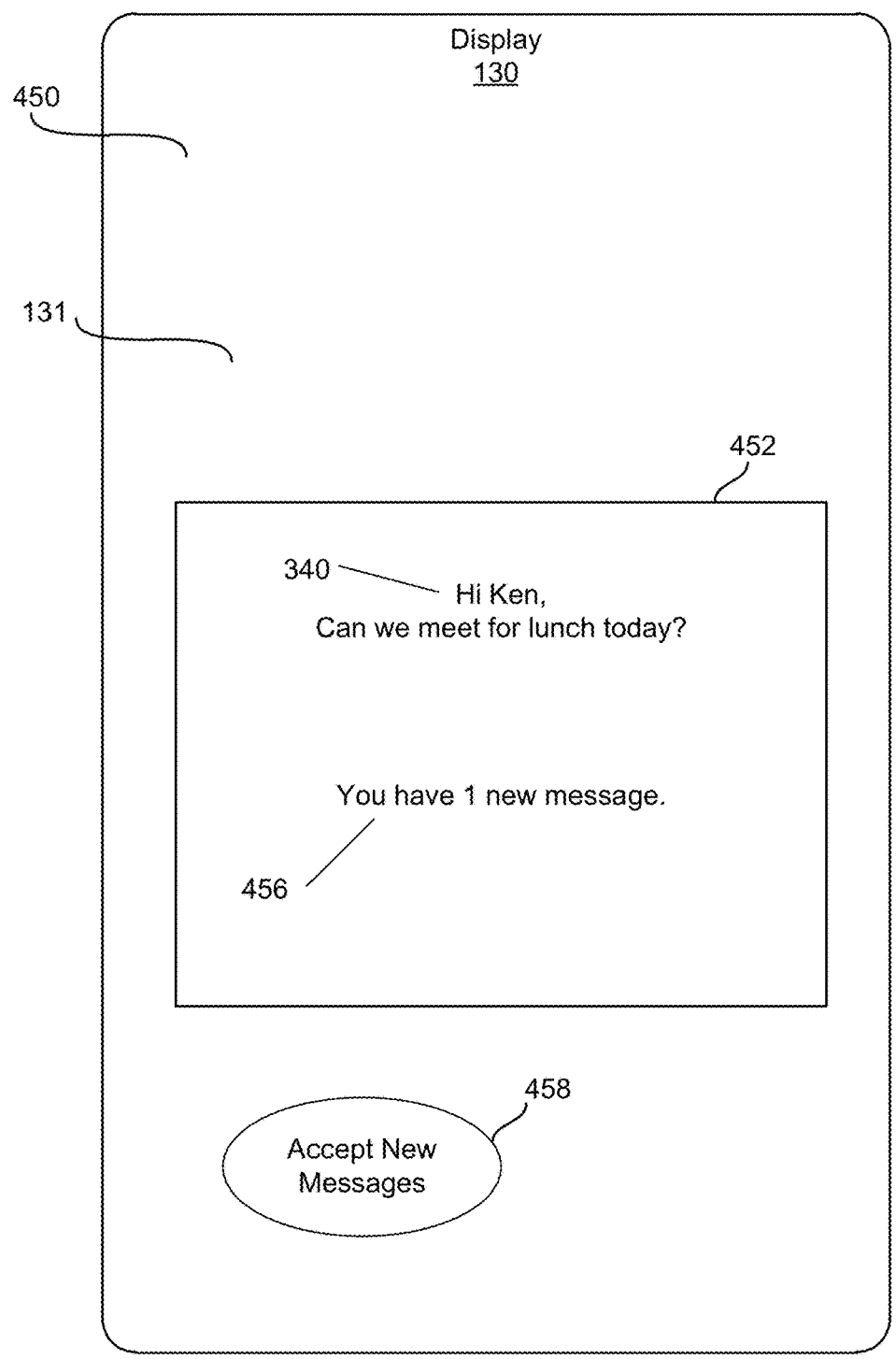
FIG. 4B is an example illustration of graphical user interface (GUI) on a display of a communication device showing a message notification and message, according to one or more embodiments.

FIG. 4B illustrates an example graphical user interface (GUI) 450 presented on display 130 of communication device 100 that can be viewed by a user. GUI 450 includes an area 452 that displays message 340 that has been received from remote computing system 190 (FIG. 2). GUI 450 further includes a message notification 456 and message acceptance icon 458. Message notification 456 is a notice received from remote computing system 190 that indicates that a message is waiting to be presented to another user (non-active user) other than the active user (user 410) of communication device 100. When selected by a user, message acceptance icon 458 triggers the transmission of message 358 (FIG. 3B) from remote computing system 190 to communication device 100.

In one embodiment, processor 220A (FIG. 2) receives a message 358 for user 410. Processor 220A receives user presence data 350 from several communication devices (100, 420, 422, 424) associated with the user. The communication devices include a first communication device 100 and at least one second communication device 422 (FIG.

4A). Processor 220A stores the received user presence data 350 (FIG. 3B) for each of the communication devices to database 226A (FIG. 2). The user presence data 350 includes distance data 356 between the user and the communication device. Processor 220A identifies, based on the user presence data, a recipient communication device (i.e., communication device 100) that is closest or in proximity to the user, from among the communication devices to deliver message 358 to user 410.

According to one aspect of the disclosure, communication devices, such as communication devices 100 and 170 can automatically scan for users, which have been registered with the device. The identity of each user is relayed to a remote computing system 190. The remote computing system keeps a connection to each communication device and maintains a database of which communication devices are near the user. When the remote computing system has a message for the user, the remote computing system can query the list of communication devices registered with the user and identify the communication device to use to deliver the message to the user. In one embodiment, the remote computing system can identify the closest communication device to a user as the delivery communication device. In another embodiment, the remote computing system can identify the nearest communication device to a user that has the capability to deliver the message type. For example, if the message is a video clip, the nearest communication device would have a display. In another embodiment, all of the communication devices in proximity to a user could be used to deliver or present the message to the user.

According to another aspect of the disclosure, remote computing system 190 can trigger all of the communication devices, which the user has been registered with, to scan for the user being in proximity when the remote computing system 190 has a message to deliver to the user. This method is more power efficient than having several communication devices continuously scanning for users. Communication devices 100 and 170 can detect registered users. Communication devices 100 and 170 can use various means to detect and identify users such as by using biometric data including facial image data, voice data or fingerprint data.

Figure 4C:
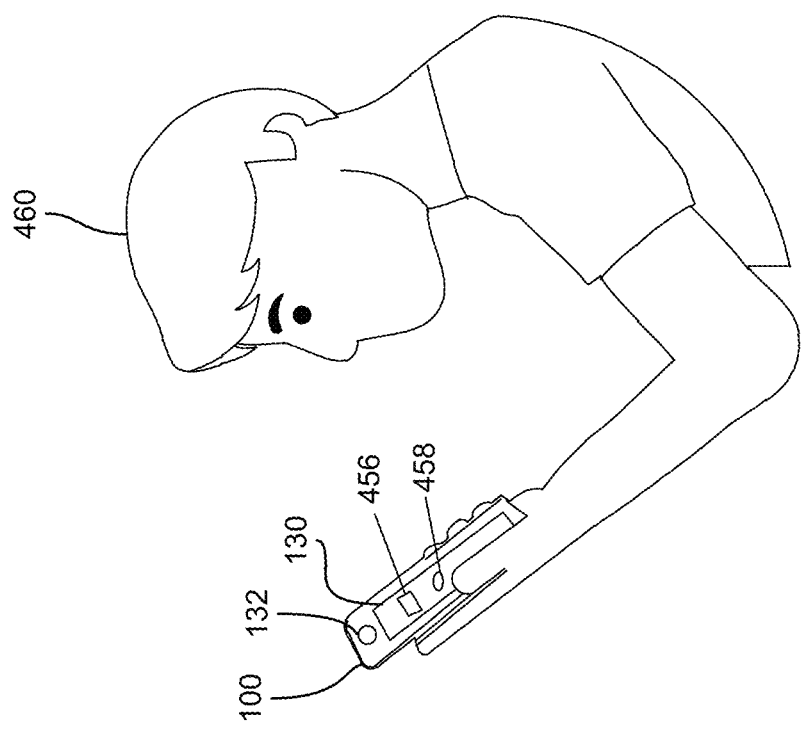
FIG. 4C is an example illustration of an active user viewing a communication device, according to one or more embodiments.
Figure 4C:
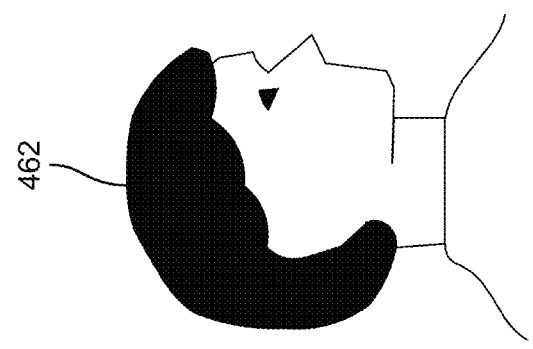

With reference to FIG. 4C, an example is shown of an active user 460 and a non-active user 462 in proximity to communication device 100. Both active user 460 and non-active user 462 are registered with communication device 100 and/or remote computing system 190. In one embodiment, active user 460 can be a primary user that would have claimed, logged in or authenticated to communication device 100 and non-active user 462 can be a secondary user. When remote computing system 190 receives a message for non-active user 462, remote computing system 190 can determine, based on user presence data received from communication device 100, if the non-active user 462 is in proximity to communication device 100. If the non-active user 462 is in proximity to communication device 100, communication device 100 can be designated as a recipient communication device to deliver the message to the non-active user 462. In one embodiment message notification 456 can be shown on display 130. Message notification 456 is a notice received from remote computing system 190 that indicates that a message is waiting to be presented to non-active user 462 of communication device 100. When selected, message acceptance icon 458 triggers the transmission of message 358 from remote computing system 190 to communication device 100.

Figure 4D:
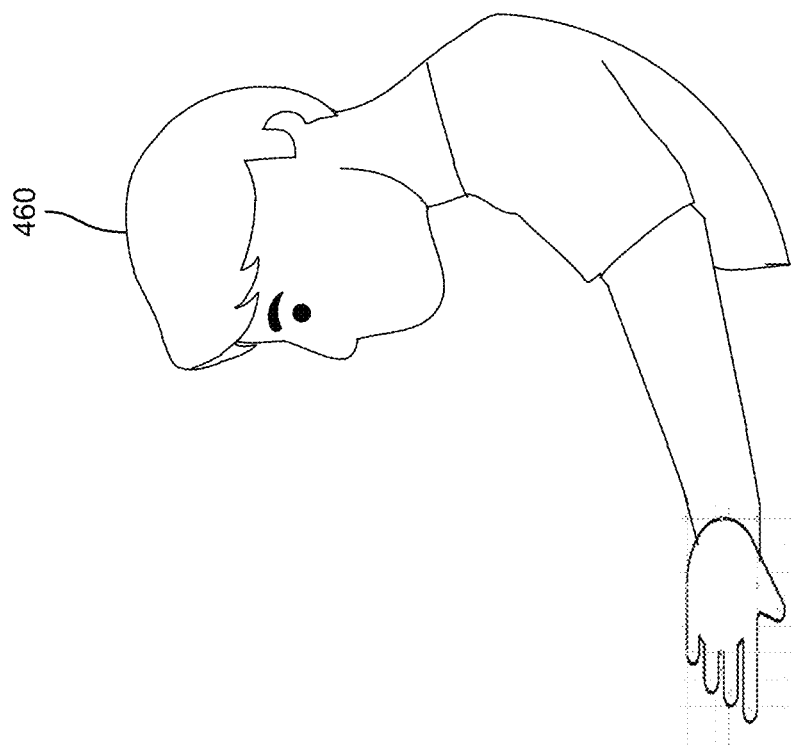
FIG. 4D is an example illustration of a non-active user viewing a communication device, according to one or more embodiments.
Figure 4D:
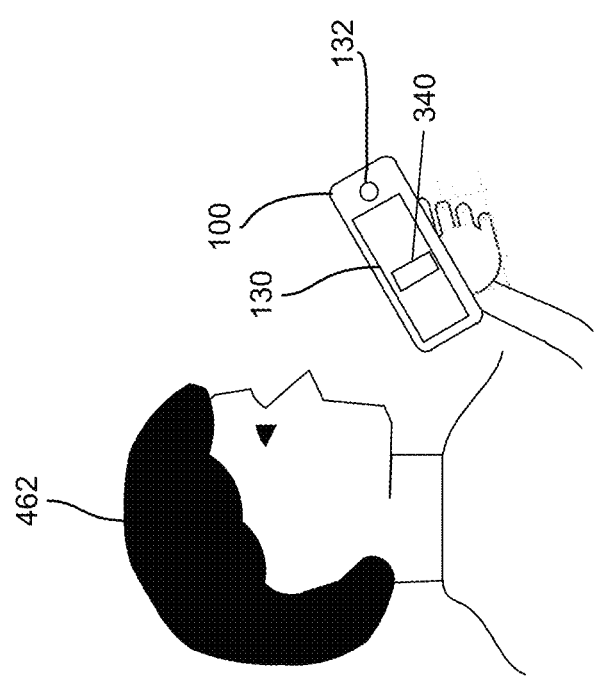

Turning to FIG. 4D, communication device 100 is shown after being handed from active user 460 to non-active user 462. After message acceptance icon 458 has been activated, message 358 is transmitted from remote computing system 190 to communication device 100 where message 358 is displayed as message 340. In one embodiment, non-active user 462 would need to log-in or authenticate to remote computing system 190 before the message is transmitted to communication device 100. In another embodiment, the message can be automatically transmitted to communication device 100 after message acceptance icon 458 has been activated.

In an embodiment, processor 220A receives a message 358 for non-active user 462. Processor 220A receives user presence data 350 from communication device 100 associated with an active user. Processor 220A determines, based on the user presence data, if the non-active user 462 is in proximity to communication device 100. In response to determining that the non-active user 462 is in proximity to communication device 100, processor 220A designates communication device 100 as a recipient communication device to deliver the message to the non-active user 462 and forwards message 340 for delivery of message 340, via communication device 100, to the non-active user.

According to one aspect of the disclosure, an active user is actively using a communication device, but a non-active user is identified as being in close proximity to the communication device. A data connection is created between the communication device and a remote computing system. If the remote computer system receives a message for the non-active user, and the non-active user does not have an active device connected, then a non-personal-information notification can be transmitted to the active user. The active user then has the option to accept the message for the non-active user. The active user hands off the device to the non-active user, who then self-authenticates to see the message. The non-active user can self-authenticate, via the communication device using various techniques such as facial recognition or by entry of a passcode. The non-active user's data is hidden from the active user. Similarly, the active user's data would be hidden from the non-active user as the non-active user borrows the communication device. Alternatively, the active or non-active user could designate another communication device to send the message to for the non-active user to self-authenticate and receive the message.

According to another aspect of the disclosure, both active and non-active users are logged in or authenticated to a remote computing system via a communication device. If both active and non-active users choose to authenticate, then both active and non-active users would have data links between the communication device and individual remote computing sessions at the remote computing system. For example, both active and non-active users could be users of a television or could both be seen and identified by an image capture device. If a remote computing session needs to notify either user, the remote computing system would send a message notification to the communication device asking the non-active user to approve the data to be shared and possibly requiring authentication. In one or more embodiments, the message notification could be customized for each user, such as a special ringtone, or chime, or a voice alert stating who the message is for and the nature of the message. The non-active user can switch the delivery communication device for the message to another communication device at which the non-active user is the active user.

Figure 5A:
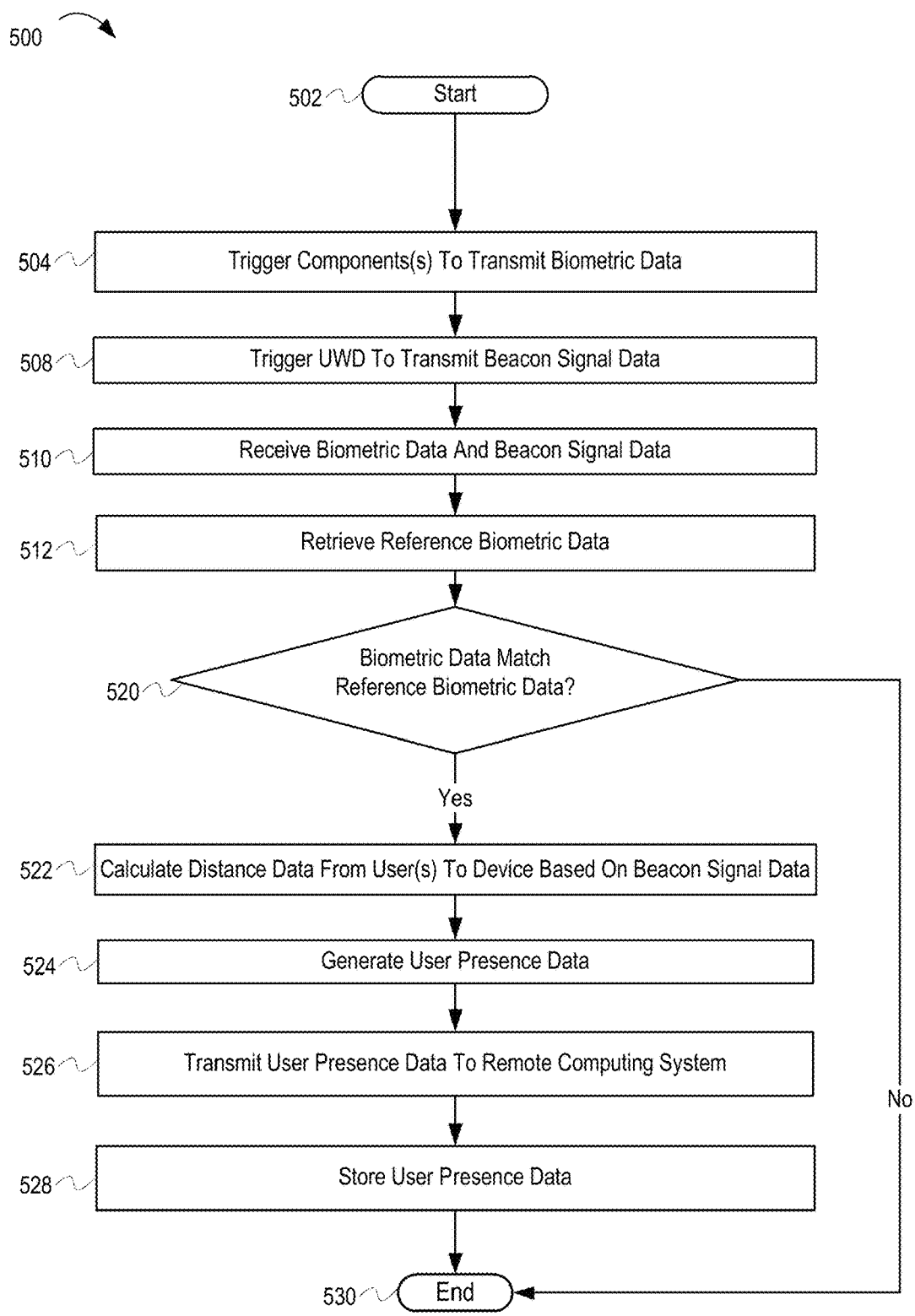
FIG. 5A depicts a flowchart of a method of identifying active and non-active users in proximity to a communication device, according to one or more embodiments.
Figure 5B:
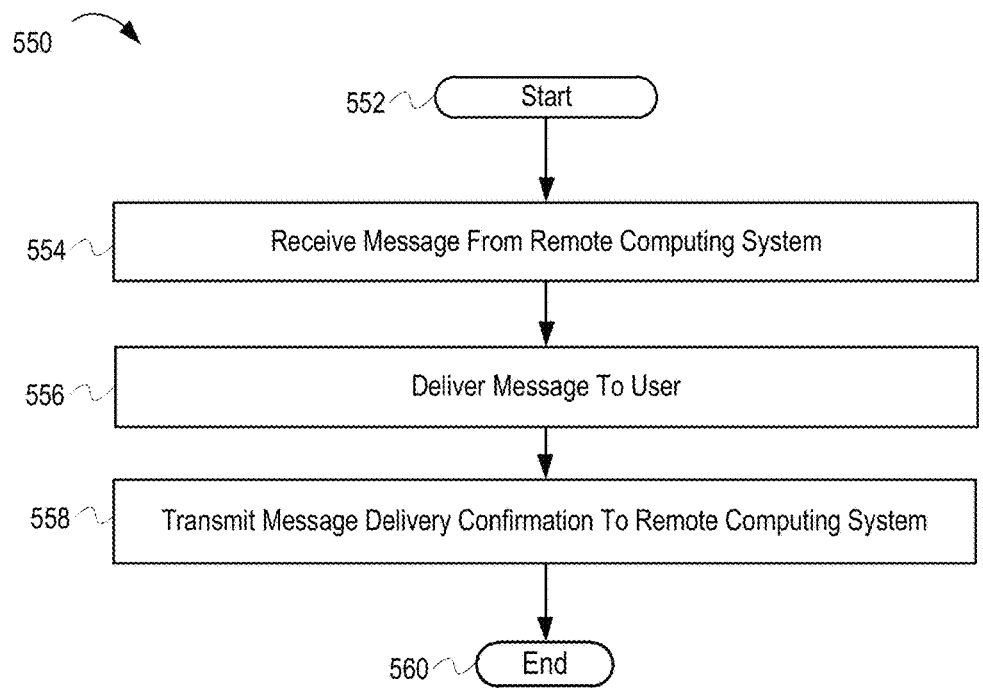
FIG. 5B depicts a flowchart of a method of selectively delivering a message to an active user via a selected communication device in proximity to the active user, according to one or more embodiments.
Figure 6:
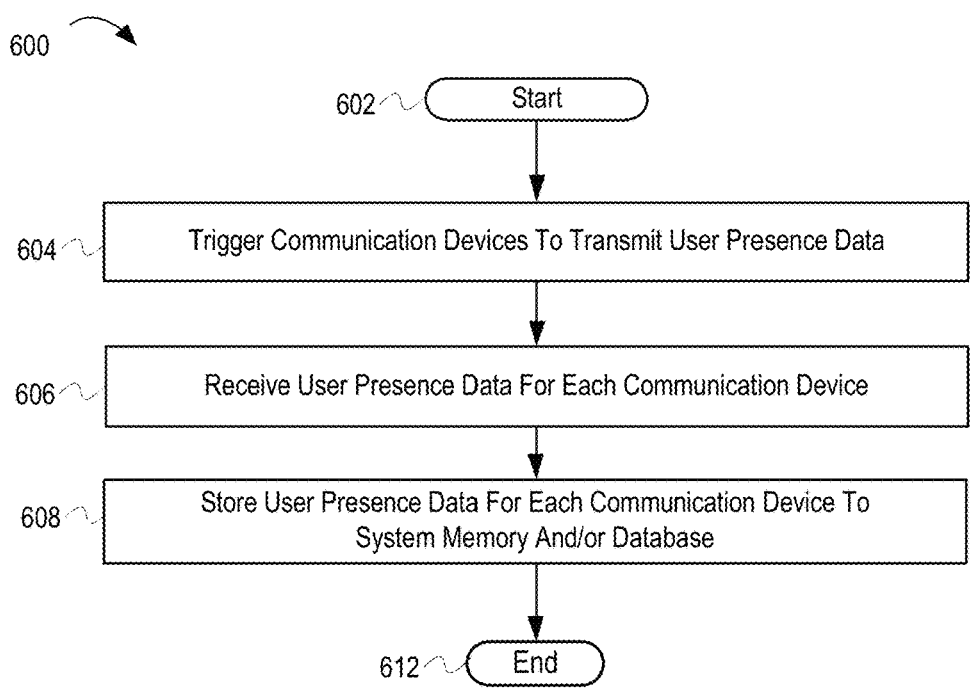
FIG. 6 depicts a flowchart of a method by which a remote computing system receives user presence data from one or more communication devices, according to one or more embodiments.
Figure 7:
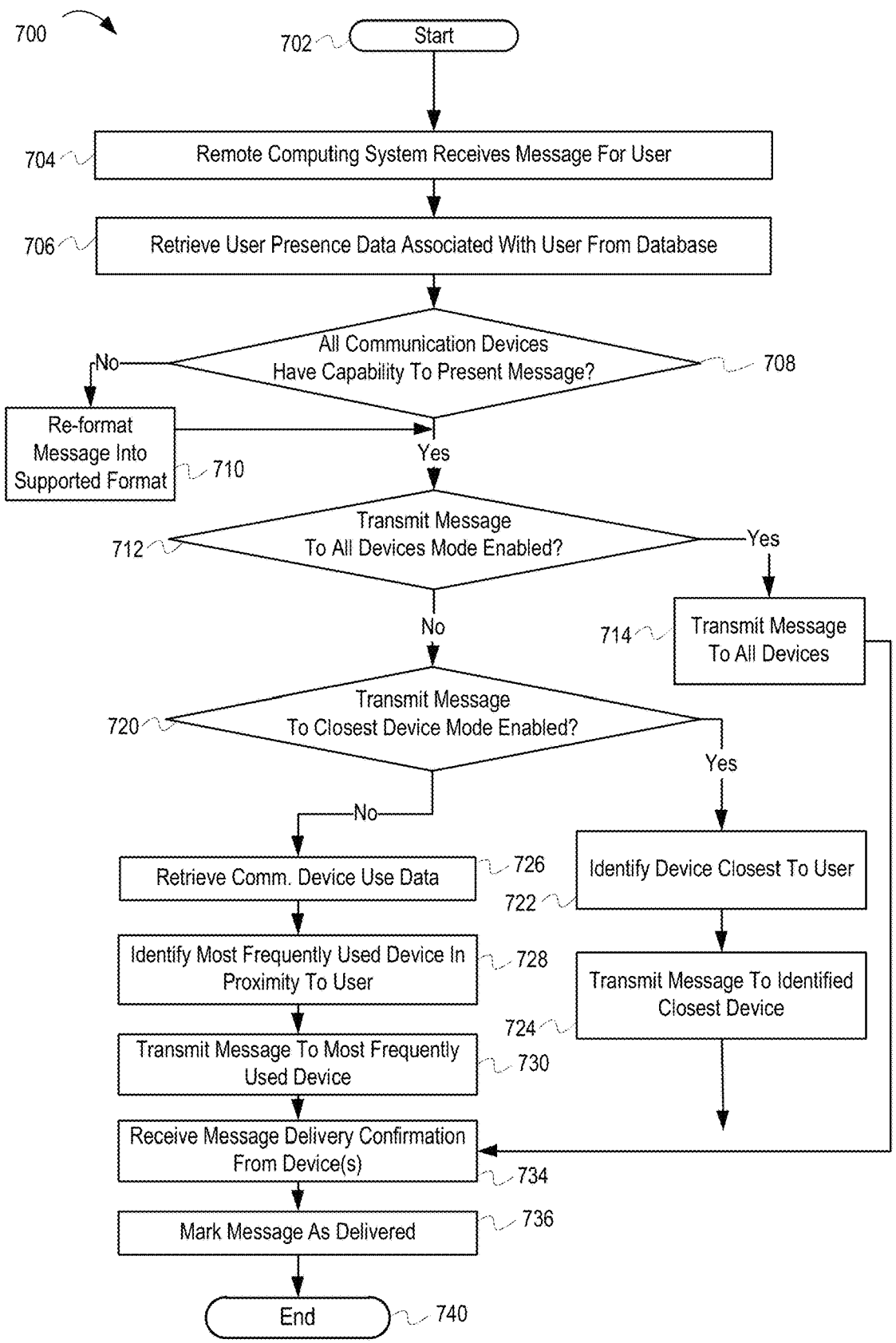
FIG. 7 depicts a flowchart of a method by which a remote computing system determines which communication device is utilized for presenting a message to an active user, according to one or more embodiments.

FIGS. 5A and 5B depict methods 500 and 550 for identifying a communication device in proximity to an active and/or inactive user to present a message. FIGS. 6 and 7 depict methods 600 and 700 for sending a message to a user of a communication device. The description of methods 500-700 will be described with reference to the components and examples of FIGS. 1A-4D. The operations depicted in FIGS. 5A and 5B can be performed by communication device 100 or 170 or any suitable device, including one or more functional components of communication device 100 that provide the described features. Specifically, one or more of the processes of the methods described in FIGS. 5A and 5B may be performed by a processor (e.g., processor 102) executing program code associated with identification module 136. The operations depicted in FIGS. 6 and 7 can be performed by remote computing system 190. Specifically, one or more of the processes of the methods described in FIGS. 6 and 7 may be performed by a processor (e.g., processor 220A) executing program code associated with messaging module 236 (FIG. 3B).

FIG. 5A illustrates a method 500 of identifying active and/or non-active users in proximity to a communication device such as communication device 100 or 170. With specific reference to FIG. 5A, method 500 begins at the start block 502. At block 504, processor 102 triggers one or more components (i.e., microphone 108, image capture device 132 and fingerprint sensor 147) of the communication device to transmit biometric data 310. Biometric data 310 can be from active and/or non-active users of the communication device who have been previously registered with the communication device. Processor 102 triggers user wearable device 192 to transmit beacon signal data 338 (block 508). Processor 102 receives biometric data 310 and beacon signal data 338 (block 510). Processor 102 retrieves reference biometric data 320 associated with at least one user of the communication device (block 512).

At decision block 520, processor 102 determines if biometric data 310 matches reference biometric data 320 for one or more users (active and/or non-active). In one embodiment, biometric data 310 can be an image captured by image capture device 132 and reference biometric data 320 can be the stored facial image of a user or registered user (active and/or non-active) associated with the communication device. For example, if the stored facial image matches the captured image, then the user is identified as being in proximity to the communication device. In response to determining that biometric data 310 does not match reference biometric data 320, method 500 ends at end block 530.

In response to determining that biometric data 310 matches reference biometric data 320, processor 102 calculates distance data 336 between identified active and/or non-active users (i.e., user 410 and/or non-active user 462) and the communication device based on beacon signal data 338 (block 522). Processor 102 generates user presence data 330 (block 524). User presence data 330 includes user identifiers 332 of identified users (active and/or non-active), device identifier 334 of the communication device, and distance data 336. Processor 102 transmits user presence data 330 to remote computing system 190 (block 526). Processor 102 stores user presence data 330 to system memory 120 (block 528). Method 500 then terminates at end block 530.

According to one aspect of the disclosure, the active user of communication device 100 or 170 is the owner, claimant, or current validated or authenticated user of the communication device. A non-active user of communication device 100 or 170 is one who is registered as being associated with the communication device, but is not the owner or current user of the communication device.

FIG. 5B illustrates a method 550 of delivering a message to a user via a communication device 100 or 170. With specific reference to FIG. 5B, method 550 begins at the start block 552. At block 554, processor 102 receives message 340 from remote computing system 190. Processor 102 delivers or presents message 340, via one or more of display 130, speaker 144, or other user interface device (block 556). Processor 102 transmits a message delivery confirmation to remote computing system 190 that the message has been delivered (block 558). Method 550 then terminates at end block 560.

FIG. 6 illustrates method 600 for enabling remote computing system 190 to receive user presence data from one or more communication devices 100 and/or 170. Method 600 begins at start block 602. At block 604, processor 220A triggers one or more of communication devices 100 and/or 170 to transmit user presence data 330. Processor 220A can transmit a request to the communication devices for the user presence data 330. Processor 220A receives user presence data from respective communication devices 100 and/or 170 (block 606). Processor 220A stores the received user presence data as user presence data 350 to system memory 222A and/or database 226A (block 608). Method 600 then terminates at end block 612.

FIG. 7 illustrates a method 700 enabling remote computing system 190 to designate one or more communication devices such as communication device 100 and/or 170 to deliver or present a message to a user. Method 700 begins at the start block 702. At block 704, processor 220A receives message 358 to deliver or present to a user, such as user 410. Processor 220A retrieves user presence data 350 from system memory 222A or database 226A (block 706).

At decision block 708, processor 220A determines if all of the communication devices have the capability to present the message to the user based on the user presence data 350. In one embodiment, processor 220A compares the device capability data 355 with the message type to determine if the communication devices have the capability to present the message to the user. For example, if the message contains video data, the device capability data would have to indicate that the device supports video data in order to present the message to the user.

In response to determining that all of the communication devices do not have the capability to present the message to the user, processor 220A re-formats the message into one or more formats that are supported by communication devices 100 and/or 170 (block 710). After block 710 and/or in response to determining that all of the communication devices have the capability to present the message to the user, processor 220A determines which delivery mode, from among multiple possible modes, has been enabled by the user for transmitting the message. At decision block 712, processor 220A determines if the device delivery mode 360 has been set to an all device delivery mode by the user to transmit the message to all communication devices. In response to determining that the all device delivery mode (360) has been enabled by the user to transmit the message to all communication devices, processor 220A transmits message 358 to all of the communication devices (i.e., to each communication device corresponding to device identifiers 354) for presentation to a user (block 714). Processor 220A receives a delivery confirmation message from one or more of the communication devices (block 734) and marks message 358 as delivered (block 736). Method 700 then ends at end block 740.

In response to determining that the all device delivery mode (360) has not been enabled by the user to transmit the message to all communication devices, processor 220A determines if the device delivery mode 360 has been set to a closest device delivery mode by the user to transmit message 358 to the closest communication device (decision block 720). In response to determining that the closest device delivery mode (360) has been enabled by the user to transmit the message to the closest communication devices, processor 220A identifies the closest communication device to the user based on distance data 356 (block 722). Processor 220A transmits message 358 to the identified closest communication device for presentation to the user (block 724).

In one embodiment, if the closest communication device does not have the capability to present the message, processor 220A can identify the next closest communication device that has the capability to present the message to the user and use that communication device to present the message. Processor 220A receives a delivery confirmation message from the identified closest communication device (block 734) and marks message 358 as delivered (block 736). Method 700 then ends at end block 740.

In response to determining that the device delivery mode 360 has not been set to an all device delivery mode or to a closest device mode, by the user, but has been set to a most frequently used delivery mode to transmit the message to the communication device that is most frequently used by the user and that is in proximity of the user, processor 220A retrieves communication device use data 362 and distance data 356 (block 726) and identifies the most frequently used communication device that is in proximity of the user, based on communication device use data 362 and distance data 356 (block 728). Processor 220A transmits message 358 to the identified most frequently used communication device for presentation to the user (block 730). In one embodiment, if the most frequently used communication device does not have the capability to present the message, processor 220A can identify the next most frequently used communication device that has the capability to present the message to the user and utilize that communication device to present the message. Processor 220A receives a delivery confirmation message from the identified closest communication device having the relevant capability (block 734) and marks message 358 as delivered (block 736). Method 700 then ends at end block 740.

Figure 8A:
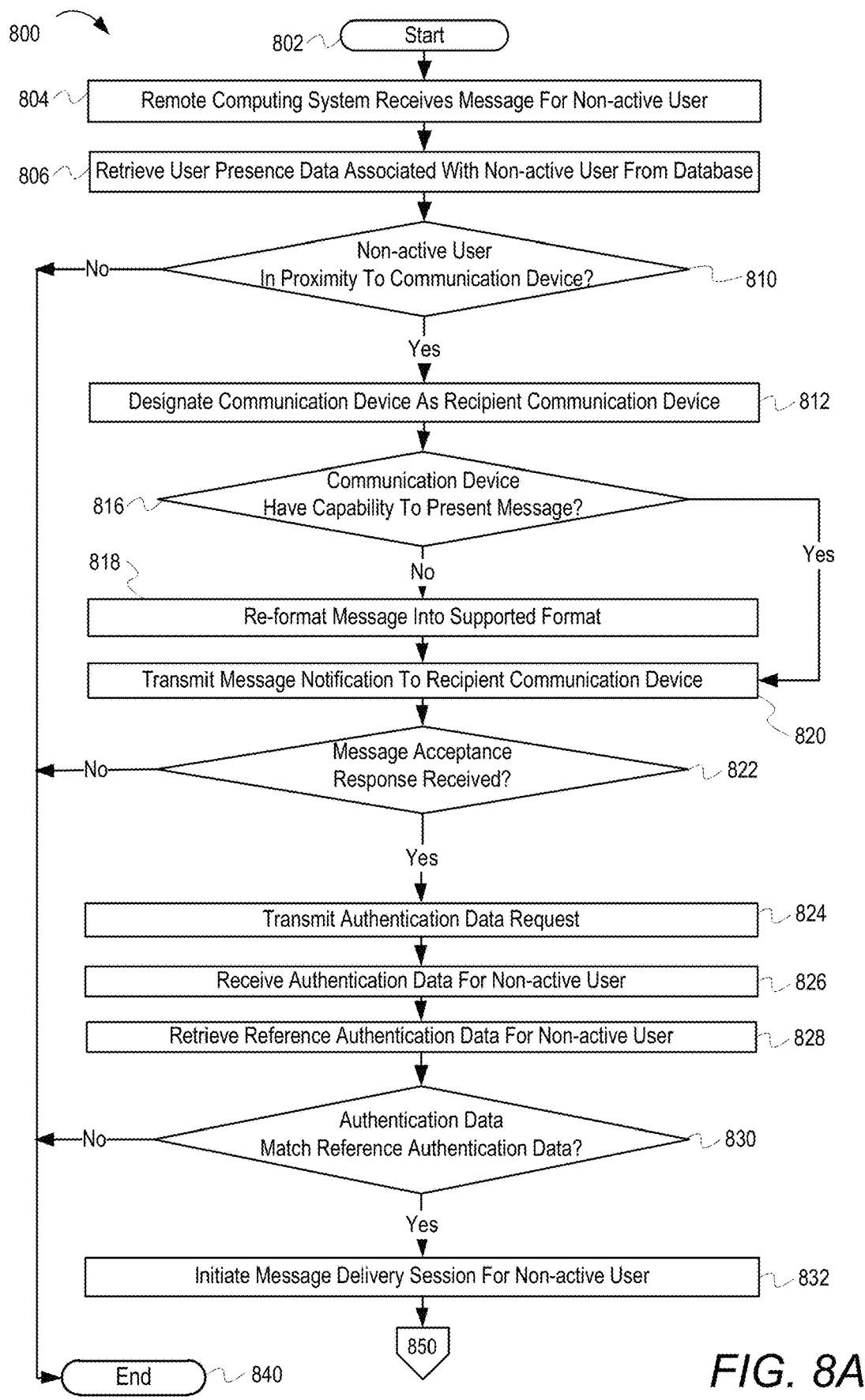
FIGS. 8A and 8B depict a flowchart of a method by which a remote computing system delivers a message to a non-active user of a communication device, according to one or more embodiments.
Figure 8B:
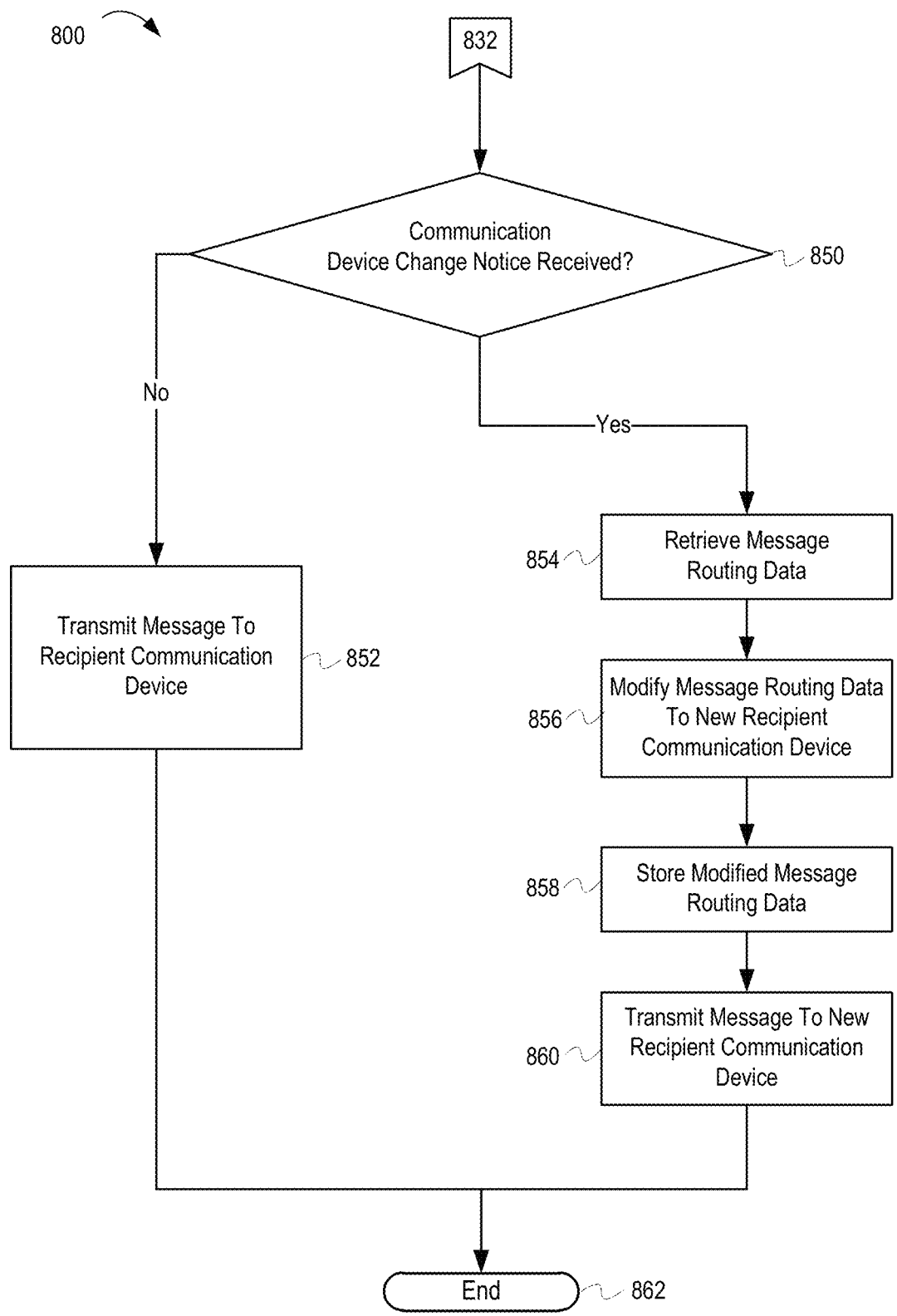
Figure 9:
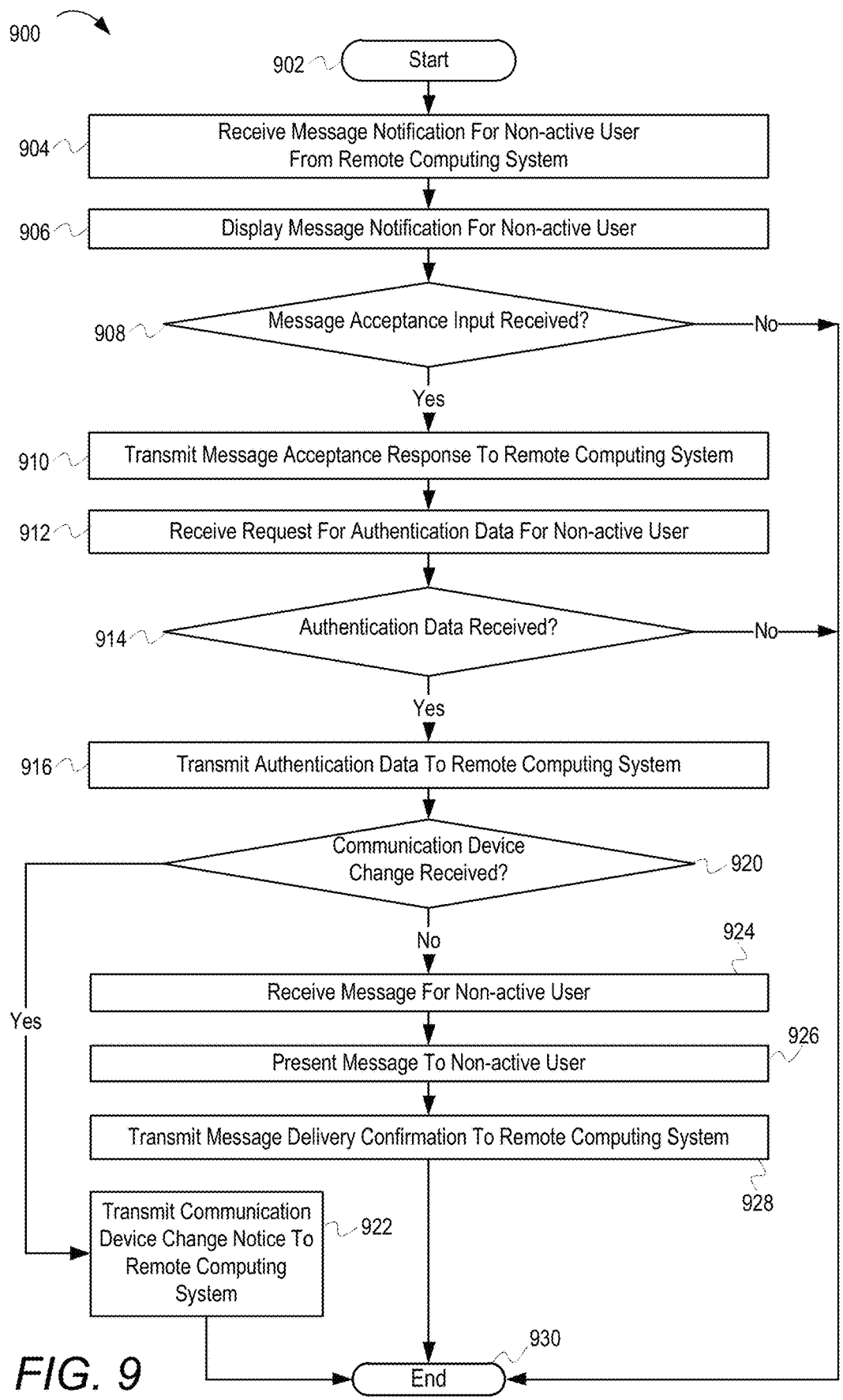
FIG. 9 depicts a flowchart of a method of delivering a message to a non-active user of a communication device, according to one or more embodiments.

FIGS. 8A, 8B and 9 depict methods 800 and 900 for determining if a non-active user is in proximity to a communication device and delivering a message to the non-active user of a communication device. The description of methods 800 and 900 will be described with reference to the components and examples of FIGS. 1A-4D. The operations depicted in FIGS. 8A and 8B can be performed by remote computing system 190. One or more of the processes of the methods described in FIGS. 8A and 8B may be performed by a processor (e.g., processor 220A) executing program code associated with messaging module 236 (FIG. 3B). The operations depicted in FIG. 9 can be performed by communication device 100 or 170. One or more of the processes of the methods described in FIG. 9 may be performed by a processor (e.g., processor 220A) executing program code associated with identification module 136.

FIG. 8A illustrates a method 800 enabling remote computing system 190 to designate one or more communication devices such as communication device 100 and/or 170 (hereinafter communication device 100) as a recipient communication device to deliver or present a message to a non-active user. Method 800 begins at the start block 802. At block 804, processor 220A receives message 358 to deliver or present a message to a non-active user such as user 462. Message 358 includes a non-active user identifier to identify the non-active user the message is intended for. Processor 220A retrieves user presence data 350 from system memory 222A or database 226A (block 806).

Processor 220A determines if the non-active user is in proximity to communication device 100 based on user presence data 350 (decision block 810). In one embodiment, if the facial image of the non-active user is captured by image capture device 132 (in user presence data 350), the non-active user can be determined to be nearby or in proximity to the communication device. In another embodiment, if the voice of the non-active user is captured by microphone 108 (in user presence data 350), the non-active user can be determined to be nearby or in proximity to the communication device. In response to the non-active user not being in proximity to communication device 100, method 800 ends at end block 840.

In response to the non-active user being in proximity to communication device 100, processor 220A designates communication device 100, as the recipient communication device (block 812). At decision block 816, processor 220A determines if the recipient communication device has the capability to present the message type to the user based on the user presence data 350. In one embodiment, processor 220A compares the device capability data 355 with the message type to determine if the recipient communication device has the capability to present the message to the non-active user. In response to determining that the recipient communication device does not have the capability to present the message to the non-active user, processor 220A re-formats the message into one or more formats that are supported by the recipient communication device (block 818).

After block 818 and in response to determining that the recipient communication device has the capability to present the message to the non-active user, processor 220A transmits a message notification 364 to the recipient communication device (block 820). Processor 220A determines if a message acceptance response 366 to the message notification has been received (decision block 822). In response to determining that the message acceptance response to the message notification has not been received, method 800 terminates at end block 840.

In response to determining that the message acceptance response 366 has been received, processor 220A transmits a request to the recipient communication device (i.e., communication device 100) for authentication data 370 (i.e., a passcode) from the non-active user (block 824). Processor 220A receives authentication data 370 (i.e., a passcode) from the recipient communication device (block 826) and retrieves reference authentication data 372 for the non-active user (block 828). Processor 220A determines if the authentication data for the non-active user matches reference authentication data for the non-active user (decision block 830). In response to the authentication data 370 for the non-active user not matching the reference authentication data 372, method 800 terminates at end block 840. In response to the authentication data 370 matching the reference authentication data 372, processor 220A initiates a message delivery session for the non-active user (block 832).

Turning to FIG. 8B, at decision block 850, processor 220A determines if a communication device change notice has been received from the recipient communication device (i.e., communication device 100). The communication device change notice includes a new device identifier of a new recipient communication device to deliver the message to the non-active user. In response to a communication device change notice not being received from the recipient communication device, processor 220A transmits message 358 to the recipient communication device (i.e., communication device 100) (block 852). Method 800 then terminates at end block 862.

In response to a communication device change notice being received from the recipient communication device, processor 220A retrieves message routing data 359 from system memory 222A (block 854) and modifies message routing data 359 for message 358 from indicating the recipient communication device (i.e., communication device 100) to indicating a new recipient communication device (block 856). Processor 220A stores the modified message routing data 359 to system memory 222A (block 858) and transmits message 358 to the new recipient communication device using the modified routing data 359 (block 860). Method 800 then ends at end block 862.

Referring to FIG. 9, a method 900 of delivering a message to a non-active user 462 (FIG. 4D) of a communication device such as communication device 100 or 170 is shown. Method 900 begins at the start block 902. At block 904, processor 102 receives a message notification 342 from remote computing system 190. Processor 102 displays or presents the message notification 342 to the active user 460 of the communication device (block 906). Processor 102 determines if message acceptance input has been received from an input device (i.e., I/O devices 106 or touch screen interface 131) of the communication device (decision block 908). In one embodiment, the message acceptance input can be provided by the active user 460.

In response to the message acceptance input not being received, method 900 terminates at end block 930. In response to the message acceptance input being received, processor 102 transmits message acceptance response 344 to remote computing system 190 (block 910). Processor 102 receives a request for authentication data 346 for the non-active user 462 from remote computing system 190 (block 912). Processor 102 determines if authentication data 346 has been received (decision block 914). In one embodiment, non-active user 462 can provide authentication data 346, such as a passcode, via I/O devices 106 or touch screen interface 131. In response to authentication data 346 not being received, method 900 ends at end block 930.

In response to authentication data 346 being received, processor 102 transmits authentication data 346 to remote computing system 190 (block 916). Processor 102 determines if a communication device change has been received (decision block 920). In one embodiment, the non-active user 462 can provide a communication device change via I/O devices 106 or touch screen interface 131. The communication device change can include a new device identifier of a new recipient communication device to deliver the message to the non-active user 462. In an embodiment, the new device identifier of the new recipient communication device can be the phone number of the new recipient communication device or the name of the new recipient communication device.

In response to receiving the communication device change, processor 102 transmits communication device change notice 348 to remote computing system 190 (block 922). Method 900 then terminates at end block 930.

In response not receiving the communication device change, processor 102 receives message 340 for the non-active user from remote computing system 190 (block 924). Processor 102 presents or delivers message 340 to non-active user 462 (block 926). In one embodiment, message 340 can be presented to non-active user 462 via one or more of display 130 and/or speaker 144. Processor 102 transmits message delivery confirmation 349 to remote computing system 190 (block 928). Method 900 then ends at end block 930.

In the above-described methods of FIGS. 5A-9, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
receiving, via a processor of a computing system, a message for one of an active user and a non-active user, the computing system comprising a messaging system;
receiving user presence data from a plurality of communication devices associated with an identity (ID) of a corresponding one of the active user (active user ID) and the non-active user (non-active user ID), the plurality of communication devices comprising a first communication device and at least one second communication device;
storing the received user presence data for each of the plurality of communication devices to a database of the computing system;
identifying, based on the user presence data, at least one recipient communication device from among the plurality of communication devices to deliver the message to the corresponding one of the active user and the non-active user; and
in response to the message being for the non-active user:
first transmitting a message notification to the at least one recipient communication device, the message notification indicating that a message is waiting to be presented to the non-active user; and transmitting the message in response to receipt of a message acceptance response from one of the at least one recipient communication device.

2. The method of claim 1, wherein the user presence data of at least one of the plurality of communication devices comprises a device identifier of a corresponding one of the plurality of communication devices, an associated user identifier, and distance data corresponding to a distance between the corresponding one of the active user and the non-active user and the corresponding communication device.

3. The method of claim 1, wherein identifying the recipient communication device from among the plurality of communication devices further comprises:
determining that the messaging system is configured in an all-device messaging mode, in which the messaging system transmits received messages intended for the corresponding one of the active user and the non-active user to all registered communication devices associated with the one of the active user and the non-active user ID; and
in response to the messaging system being configured in the all-device messaging mode, transmitting the message to each of the plurality of communication devices associated with the user ID and that is in proximity to the corresponding one of the active user and the non-active user.

4. The method of claim 1, further comprising:
determining if a received message type is not supported by at least one of the plurality of communication devices; and
in response to determining that the received message type is not supported by at least one of the plurality of communication devices, reformatting the message type into at least one format supported by the at least one of the plurality of communication devices.

5. The method of claim 1, wherein identifying the recipient communication device from among the plurality of communication devices further comprises:
determining that the messaging system is configured in a closest-device messaging mode, in which the messaging system transmits received messages intended for the corresponding one of the active user and the non-active user to a closest registered communication device associated with the user ID;
in response to the messaging system being configured in the closest-device messaging mode, identifying as the recipient communication device, the communication device that is closest to the corresponding one of the active user and the non-active user from among the plurality of communication devices, the identifying based on the user presence data; and
transmitting the message to the recipient communication device.

6. The method of claim 1, wherein identifying the recipient communication device from among the plurality of communication devices further comprises:
receiving and tracking usage data of each of the plurality of communication devices;

determining that the messaging system is configured in a most-frequent messaging mode, in which the messaging system transmits received messages intended for the corresponding one of the active user and the non-active user to a most frequently used registered communication device associated with the user ID, in response to the messaging system being configured in the most-frequent messaging mode, identifying, based on the tracking usage data, a most frequently used communication device as the recipient communication device; and transmitting the message to the recipient communication device.

7. A computing system comprising:

a memory having stored thereon a messaging application for delivering a message to one of an active user and a non-active user via at least one communication device from among a plurality of communication devices; and one or more processors communicatively coupled to the memory, the one or more processors executing program code of the messaging module to provide a messaging system, which enables the computing system to:

receive a message for a corresponding one of the active user and the non-active user;

receive user presence data from a plurality of communication devices associated with the user identity of a corresponding one of the active user (active user ID) and the non-active user (non-active user ID), the plurality of communication devices comprising a first communication device and at least one second communication device;

store the received user presence data for each of the plurality of communication devices to a database of the computing system;

identify, based on the user presence data, at least one recipient communication device from among the plurality of communication devices to deliver the message to the corresponding one of the active user and the non-active user; and in response to the message being for the non-active user: first transmit a message notification to the at least one recipient communication device, the message notification indicating that a message is waiting to be presented to the non-active user; and transmit the message in response to receipt of a message acceptance response from one of the at least one recipient communication device.

8. The computing system of claim 7, wherein the user presence data of at least one of the plurality of communication devices comprises a device identifier of a corresponding one of the plurality of communication devices, an associated user identifier, and distance data corresponding to a distance between the corresponding one of the active user and the non-active user and the corresponding communication device.

9. The computing system of claim 7, wherein identifying the recipient communication device from among the plurality of communication devices further enables the one or more processors to:

determine if the messaging system is configured in an all-device messaging mode, in which the messaging system transmits received messages intended for the corresponding one of the active user and the non-active user to all registered communication devices associated with the user ID; and in response to the messaging system being configured in the all-device messaging mode, transmit the message to each of the plurality of communication devices associated with the user ID and that is in proximity to the corresponding one of the active user and the non-active user.

10. The computing system of claim 7, wherein the one or more processors are further enabled to:

determine if a received message type is not supported by at least one of the plurality of communication devices; and in response to determining that the received message type is not supported by at least one of the plurality of communication devices, reformat the message type into at least one format supported by the at least one of the plurality of communication devices.

11. The computing system of claim 7, wherein identifying the recipient communication device from among the plurality of communication devices further enables the one or more processors to:

determine if the messaging system is configured in a closest-device messaging mode, in which the messaging system transmits received messages intended for the corresponding one of the active user and the non-active user to a closest registered communication device associated with the user ID;

in response to the messaging system being configured in the closest-device messaging mode, identify as the recipient communication device, the communication device that is closest to the corresponding one of the active user and the non-active user from among the plurality of communication devices, the identifying based on the user presence data; and transmit the message to the recipient communication device.

12. The computing system of claim 7, wherein identifying the recipient communication device from among the plurality of communication devices further enables the one or more processors to:

receive and track usage data of each of the plurality of communication devices;

determine if the messaging system is configured in a most-frequent messaging mode, in which the messaging system transmits received messages intended for the corresponding one of the active user and the non-active user to a most frequently used registered communication device associated with the user ID;

in response to the messaging system being configured in the most-frequent messaging mode, identify, based on the tracking usage data, a most frequently used communication device as the recipient communication device; and transmit the message to the recipient communication device.

13. A computer program product comprising:

a computer readable storage device with program code stored thereon which, when executed by one or more processors of a computing system implements a messaging system that enables the computing system to complete the functionality of:

receiving a message for a user;

receiving user presence data from a plurality of communication devices associated with an identity (ID) of the active user (active user ID) and the non-active user (non-active user ID), the plurality of communication devices comprising a first communication device and at least one second communication device;

storing the received user presence data for each of the plurality of communication devices to a database of the computing system;

identifying, based on the user presence data and the messaging mode that the messaging system is configured in, at least one recipient communication device from among the plurality of communication devices to deliver the message to the corresponding one of the active user and the non-active user; and in response to the message being for the non-active user: first transmitting a message notification to the at least one recipient communication device, the message notification indicating that a message is waiting to be presented to the non-active user; and transmitting the message in response to receipt of a message acceptance response from one of the at least one recipient communication device.

14. The computer program product of claim 13, wherein the program code for identifying a recipient communication device comprises program code that further enables the computing system to complete the functionality of:

determining if the messaging system is configured in an all-device messaging mode, in which the messaging system transmits received messages intended for the corresponding one of the active user and the non-active user to all registered communication devices associated with the user ID; and in response to the messaging system being configured in the all-device messaging mode, transmitting the message to each of the plurality of communication devices associated with the user ID and that is in proximity to the corresponding one of the active user and the non-active user.

15. The computer program product of claim 13, wherein the program code for identifying a recipient communication device comprises program code that further enables the computing system to complete the functionality of:

determining if a received message type is not supported by at least one of the plurality of communication devices; and in response to determining that the received message type is not supported by at least one of the plurality of communication devices, reformatting the message type into at least one format supported by the at least one of the plurality of communication devices.

16. The computer program product of claim 13, wherein the program code for identifying a recipient communication device comprises program code that further enables the computing system to complete the functionality of:

determining if the messaging system is configured in a closest-device messaging mode, in which the messaging system transmits received messages intended for the corresponding one of the active user and the non-active user to a closest registered communication device associated with the user ID;

in response to the messaging system being configured in the closest-device messaging mode, identifying as the delivery communication device, the communication device that is closest to the corresponding one of the active user and the non-active user from among the plurality of communication devices, the identifying based on the user presence data; and transmitting the message to the recipient communication device.

* * * * *